(12) United States Patent
Shirakawa et al.

(10) Patent No.: US 6,357,931 B1
(45) Date of Patent: Mar. 19, 2002

(54) HYBRID CONNECTOR

(75) Inventors: Tsuguhito Shirakawa; Toru Yamaguchi; Nobuyuki Akeda; Toshiharu Takahashi, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/531,228

(22) Filed: Mar. 20, 2000

(30) Foreign Application Priority Data

Nov. 19, 1999 (JP) .......................................... 11-329059

(51) Int. Cl.[7] ................................................ G02B 6/38
(52) U.S. Cl. ............................. 385/75; 385/53; 385/55; 385/56
(58) Field of Search ............................. 385/75, 53, 55, 385/56, 60, 88, 92

(56) References Cited

U.S. PATENT DOCUMENTS

| | | | | |
|---|---|---|---|---|
| 4,993,803 A | * | 2/1991 | Suverison et al. ......... 350/96.2 |
| 5,109,452 A | * | 4/1992 | Selvin et al. ................. 385/69 |
| 5,671,311 A | * | 9/1997 | Stillie et al. ................... 385/89 |
| 5,745,622 A | * | 4/1998 | Birnbaum et al. ............. 385/75 |
| 6,033,125 A | * | 3/2000 | Stillie et al. ................... 385/75 |
| 6,095,698 A | * | 8/2000 | Strab et al. .................... 385/88 |

\* cited by examiner

*Primary Examiner*—Rodney Bovernick
*Assistant Examiner*—Sung Pak
(74) *Attorney, Agent, or Firm*—Armstrong, Westerman & Hattori, LLP

(57) ABSTRACT

A hybrid connector consists of an optical fiber cable having a ferrule attached at one end thereof, an optical adapter having a receiving cavity for the one end of the optical fiber cable, an electrical connector having terminal receiving cavities for receiving electrical terminals and an optical adapter mount section for receiving the optical adapter, a cover which receives the optical adapter, and an optical housing having a housing side receiving cavity for the one end of the optical fiber cable. The hybrid connector, depending on the constituent elements selected, can be provided as an optical/electrical connector, a first optical connector and a second optical connector, so as to match to the mating connector.

15 Claims, 35 Drawing Sheets

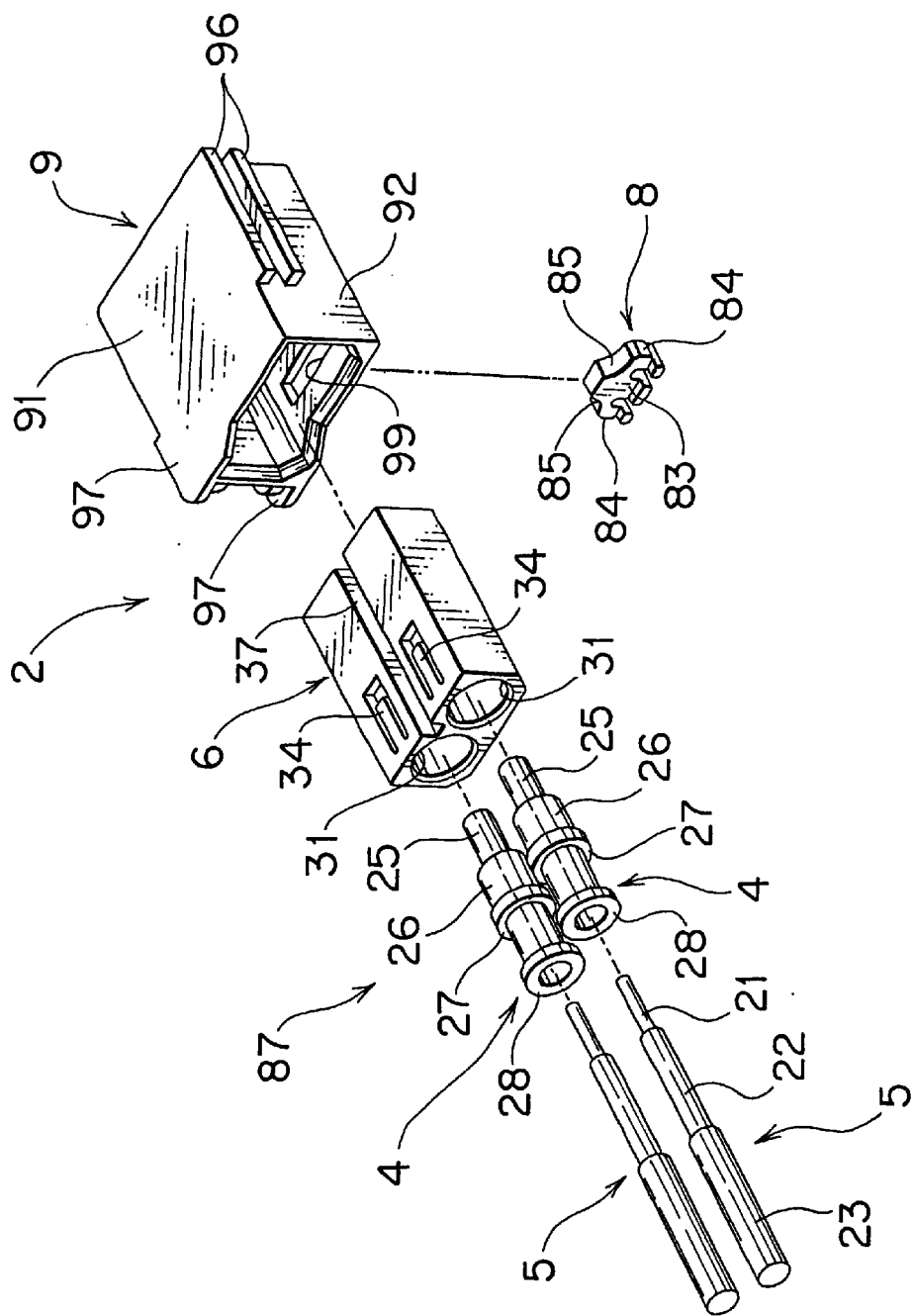
F I G. 25

HYBRID CONNECTOR

BACKGROUND OF THE INVENTION

1. Field of the Invention

This invention relates to a hybrid connector including an optical fiber cable with a ferrule attached at the end thereof, which is used in a vehicle such as an automobile.

2. Description of the Related Art

In a vehicle such as an automobile, there are many signals transmitted from various sensors and many signals used to control various electronic components. If these signals are transmitted by using individual signal lines, the number of the signal lines becomes large, resulting in the wiring harness weighing very heavy. In addition, the information transmitted has had large volumes and densities year by year.

To cope with this, in recent years, there has been adopted a system in which part of the wiring harnesses are replaced by optical fiber cables. For example, a connection has been made between nodes by an optical fiber cable.

With such system, however, because connection between electronic components and optical fiber cables is made through various forms of connector-connection, there exist a large number of optical fiber cables having connector in different forms, adversely affecting the production management and the production cost. The general versatility has also been impaired.

SUMMARY OF THE INVENTION

This invention has been accomplished to overcome the above drawbacks and an object of this invention is to provide a hybrid connector the form of which is selectable, in connecting to electronic components, in accordance with the form of connection of a mating connector.

In order to attain the object, according to an aspect of this invention, there is provided a hybrid connector which comprises: an optical fiber cable having a ferrule attached at one end thereof; an optical adapter having an insertion opening and a receiving cavity for the one end of the optical fiber cable and a connection opening located at a side opposite the insertion opening for connection therethrough of the one end of the optical fiber cable, arranged contiguously along an insertion direction of the one end of the optical fiber cable; an electrical connector having terminal receiving cavities formed therein for receiving electrical terminals and an optical adapter mount section for receiving the optical adapter; an optical adapter cover for receiving the optical adapter, having walls arranged circumferentially relative to the insertion direction of the one end of the optical fiber cable; and an optical housing having a housing side insertion opening and a housing side receiving cavity for the one end of the optical fiber cable and a housing side connection opening located at a side opposite the housing side insertion opening for connection therethrough of the one end of the optical fiber cable, arranged contiguously along the insertion direction of the one end of the optical fiber cable; wherein the hybrid connector is selectively assembled as an optical/electrical connector including the optical fiber cable, the optical adapter and the electrical connector, as a first optical connector including the optical fiber cable, the optical adapter and the optical adapter cover, or as a second optical connector including the optical fiber cable and the optical housing.

The hybrid connector of the above construction, depending on the constituent elements selected, can be provided as an optical/electrical connector, a first optical connector and a second optical connector, and its form is thus selectable in compliance with the form of the mating connector.

Preferably, the optical adapter cover and the optical housing have substantially the same outside configuration to be selectively mountable in the same mating optical connector.

Preferably, the hybrid connector further comprises a holder, and the optical adapter, the electrical connector, the optical adapter cover and the optical housing have an engagement hole substantially of the same size for the holder, wherein when the hybrid connector is assembled as the optical/electrical connector, the holder is fitted and inserted, in a direction perpendicular to the insertion direction of the one end of the optical fiber cable, through the engagement holes of the electrical connector and the optical adapter to come into locking engagement with the optical adapter and the ferrule, wherein when the hybrid connector is assembled as the first optical connector, the holder is fitted and inserted through the engagement holes of the optical adapter cover and the optical adapter to come into locking engagement with the optical adapter and the ferrule, and wherein when the hybrid connector is assembled as the second optical connector, the holder is fitted and inserted through the engagement hole of the optical housing to come into locking engagement with the ferrule.

Advantageously, the ferrule has a circumferential flange at an intermediate length thereof, and the holder comes into locking engagement with the circumferential flange.

Advantageously, the optical adapter has a locking projection projecting in a cantilever manner into the receiving cavity to engage with the circumferential flange of the ferrule to double lock the one end of the optical fiber cable in the receiving cavity.

Preferably, the receiving cavity of the optical adapter and the housing side receiving cavity of the optical housing have substantially the same size to receive the one end of the optical fiber cable.

Preferably, the hybrid connector is of a female type.

Preferably, the receiving cavity of the optical adapter and the housing side receiving cavity of the optical housing have a longitudinal length larger than that of the ferrule, so that a tip end of the ferrule received in either one of the receiving cavities is not exposed from the respective connection opening.

In the hybrid connector as mentioned above, the tip end of the ferrule is not exposed outside. In this way, the tip end of the ferrule is protected, prior to connector-connection to a mating connector, from damages and the like.

According to another aspect of this invention, there is provided a hybrid connector which comprises: an optical fiber cable having a ferrule attached at one end thereof; an optical adapter having an insertion opening and a receiving cavity for the one end of the optical fiber cable and a connection opening located at a side opposite the insertion opening for connection therethrough of the one end of the optical fiber cable, arranged contiguously along an insertion direction of the one end of the optical fiber cable; an electrical connector having terminal receiving cavities formed therein for receiving electrical terminals and an optical adapter mount section for receiving the optical adapter; and an optical adapter cover for receiving the optical adapter, having walls arranged circumferentially relative to the insertion direction of the one end of the optical fiber cable; wherein the hybrid connector is selectively assembled as an optical/electrical connector including the optical fiber cable, the optical adapter and the electrical connector, or as an optical connector including the optical fiber cable, the optical adapter and the optical adapter cover.

The hybrid connector of the above construction, depending on the constituent elements selected, can be provided as an optical/electrical connector or an optical connector, and its form is thus selectable in compliance with the form of the mating connector.

Preferably, the hybrid connector further comprises a holder, and the optical adapter, the electrical connector and the optical adapter cover have an engagement hole substantially of the same size for the holder, wherein when the hybrid connector is assembled as the optical/electrical connector, the holder is fitted and inserted, in a direction perpendicular to the insertion direction of the one end of the optical fiber cable, through the engagement holes of the electrical connector and the optical adapter to come into locking engagement with the optical adapter and the ferrule, and wherein when the hybrid connector is assembled as the optical connector, the holder is fitted and inserted through the engagement holes of the optical adapter cover and the optical adapter to come into locking engagement with the optical adapter and the ferrule.

Advantageously, the ferrule has a circumferential flange at an intermediate length thereof, and the holder comes into locking engagement with the circumferential flange.

Advantageously, the optical adapter has a locking projection projecting in a cantilever manner into the receiving cavity to engage with the circumferential flange of the ferrule to double lock the one end of the optical fiber cable in the receiving cavity.

Preferably, the hybrid connector is of a female type.

Preferably, the receiving cavity of the optical adapter has a longitudinal length larger than that of the ferrule, so that a tip end of the ferrule received in the receiving cavity is not exposed from the connection opening.

Preferably, two of the optical fiber cables are provided, one for sending and the other for receiving optical signals.

The above and other objects, features and advantages of this invention will become apparent from the following description and the appended claims, taken in conjunction with the accompanying drawings.

BRIEF DESCRIPTION OF THE DRAWINGS

FIG. 25 is an exploded perspective view of a female optical connector as in FIG. 1;

DESCRIPTION OF THE PREFERRED EMBODIMENT

One embodiment of this invention will now be described with reference to the attached drawings.

Figure 1:
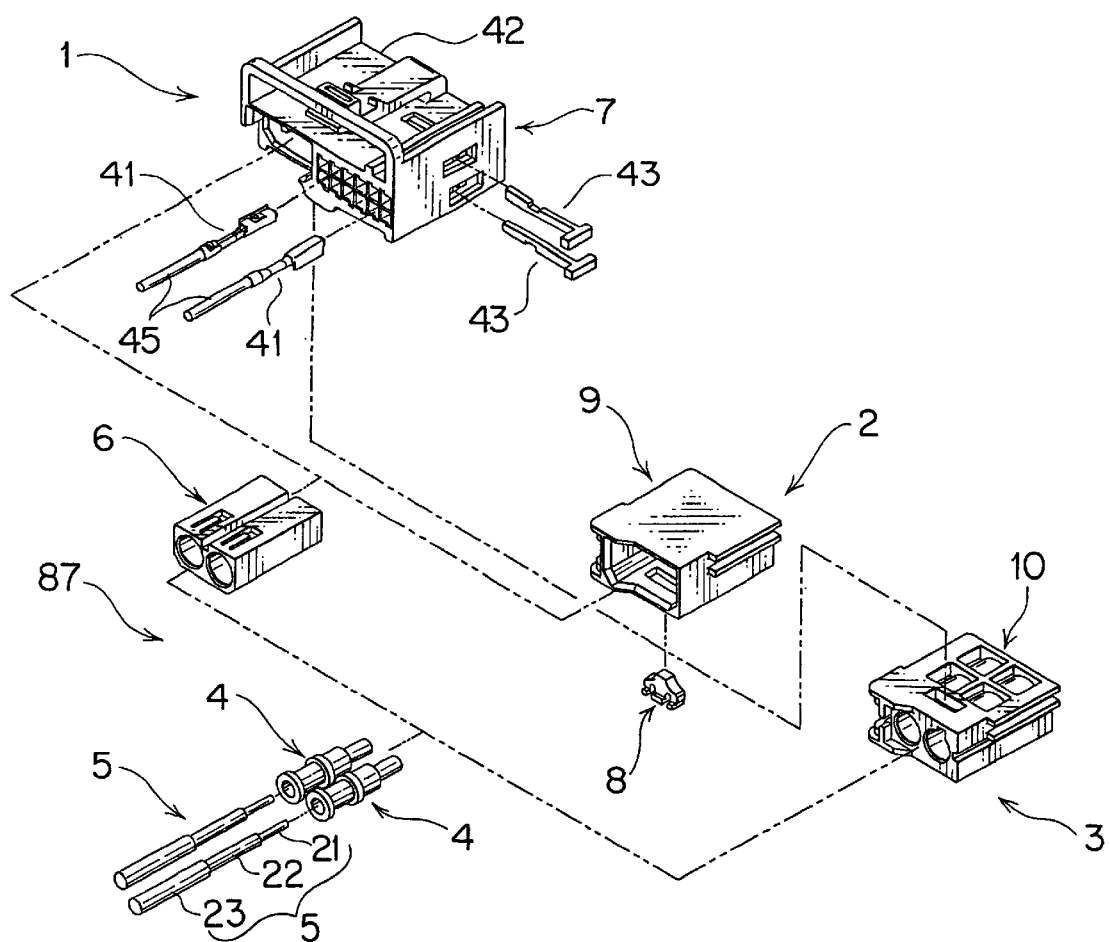
FIG. 1 is an exploded perspective view of a hybrid connector according to one embodiment of this invention.
Figure 2:
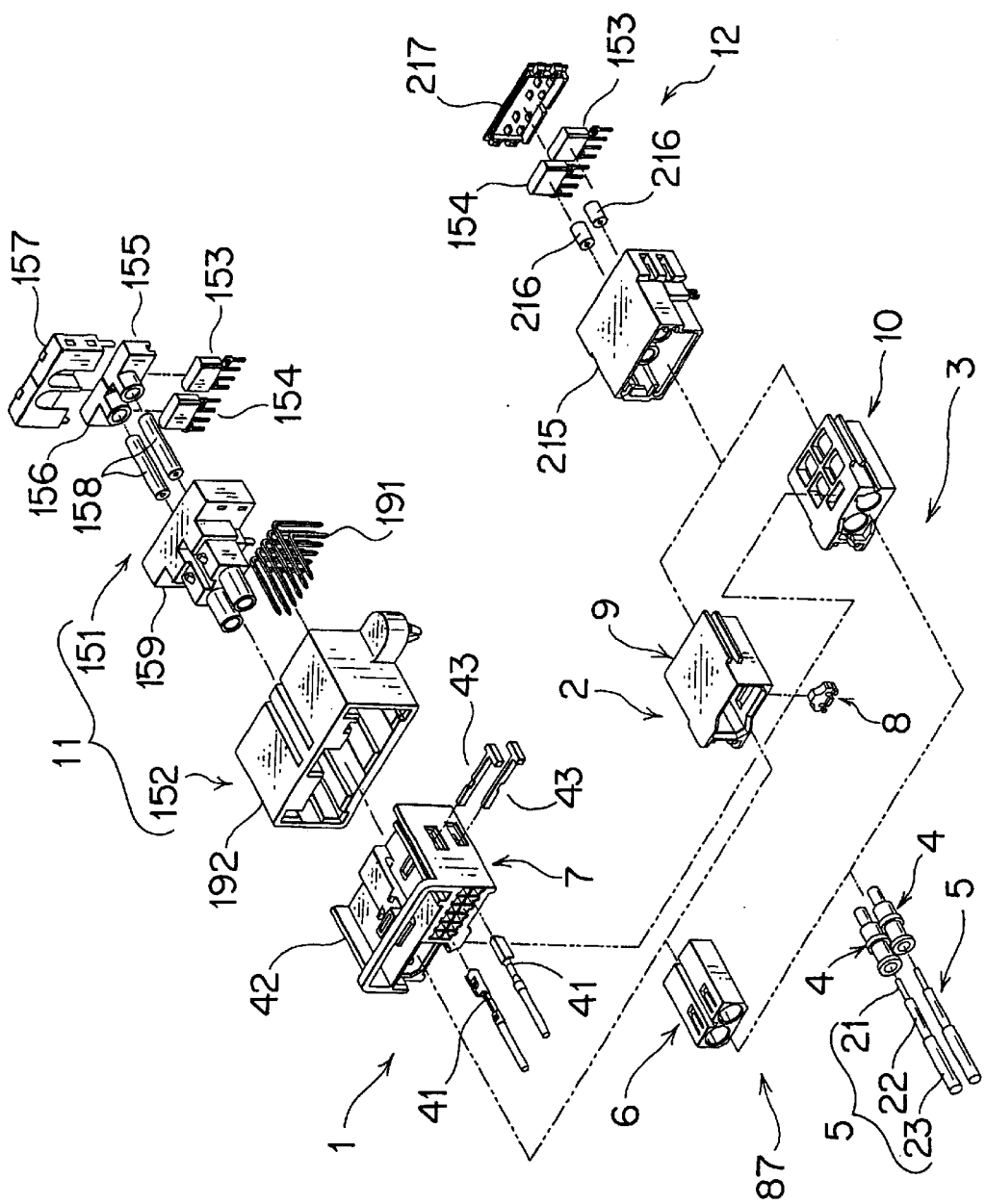
FIG. 2 is a view similar to FIG. 1, with mating connectors also shown.

FIG. 1 is an exploded perspective view of a hybrid connector according to one embodiment of this invention. FIG. 2 is an exploded perspective view of the hybrid connector, shown with mating connectors.

In FIG. 1, the hybrid connector of this invention, which takes the form of a female connector in the present embodiment, is constituted as an optical/electrical connector 1 or as an optical connector 2, 3 through selection of its constituent elements.

In other words, the optical/electrical connector 1 is constituted by optical fiber cables 5, 5 with a ferrule 4, 4 attached at their end, an optical adapter 6, an electrical connector 7 and a holder 8. The optical connector 2 is constituted by the optical fiber cables 5, 5, the optical adapter 6, an optical adapter cover 9, and the holder 8, and the optical connector 3 by the optical fibers 5, 5, an optical housing 10 and the holder 8.

In FIG. 2, the optical/electrical connector 1 is adapted to connector-connect to a male optical/electrical connector 11. Each optical connector 2, 3 is adapted to connector-connect to a male optical connector 12. The selection of the optical/electrical connector 1 or the optical connector 2, 3 is dependent upon the form of the mating male connector, i.e., the optical/electrical connector 11 or the optical connector 12.

The optical/electrical connector 1, optical connector 2, optical connector 3, optical/electrical connector 11 and optical connector 12 will now be described in detail in the order mentioned.

Figure 3:
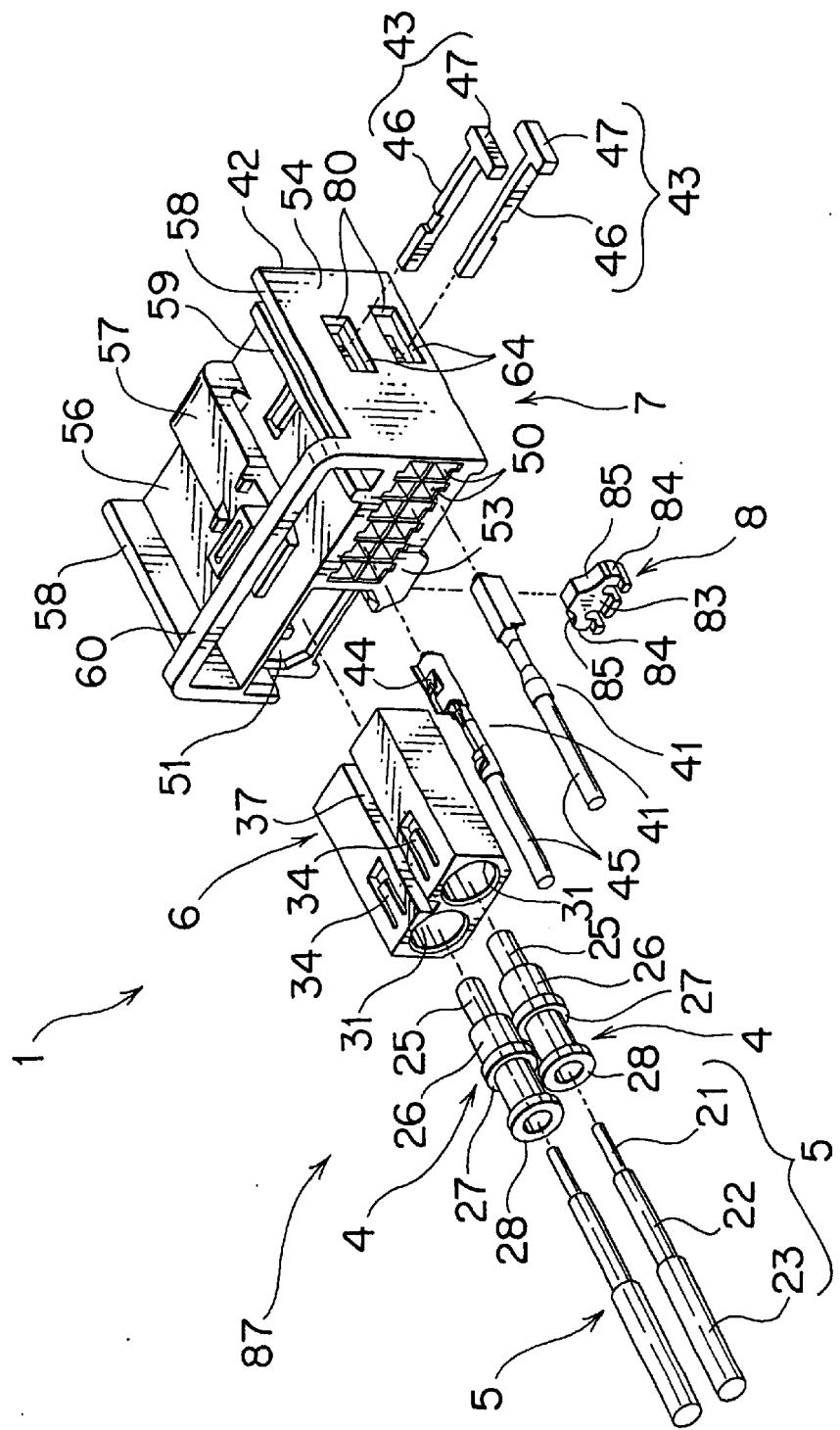
FIG. 3 is an exploded perspective view of an optical/electrical connector as in FIG. 1.

The optical/electrical connector 1, as mentioned above, is a female connector and, as shown in FIG. 3, includes the optical fiber cables 5, 5 each with a ferrule 4 fitted at one end, the optical adapter 6, the electrical connector 7 and the holder 8, and serves the functions of an optical connector and an electrical connector.

The optical fiber cable 5 is made up of a plastic optical fiber 21, a first sheath 22 covering the plastic optical fiber 21, and a second sheath 23 provided to cover the first sheath.

The plastic optical fiber (hereinafter abbreviated as POF) 21 is a transmission line for transmitting optical signals, has a circular cross section, and has a transparent core at the center for the transmission of optical signals and a transparent outer clad which has a smaller refractive index than that of the core.

The first sheath 22 and the second sheath 23 are formed of insulating synthetic resin material and are stripped by respective predetermined lengths at the end, so that the POF 21 and the first sheath 22 are exposed in a stepwise manner.

The ferrules 4 are made of synthetic resin and are provided in cylindrical form having a small diameter portion 25 and a large diameter portion 26 contiguous to the small diameter portion, the former receiving the POF 21 and the latter the first sheath 22.

The POF 21, when inserted, is exposed from the distal end of the small diameter portion 25. The large diameter portion 26 is provided on its outer periphery with two flanges 27, 28, the flange 27 being located at an intermediate length of the large diameter portion 26 and the flange 27 at the proximal end. The distal end of the second sheath 23 abuts against the flange 28.

The optical fiber cables 5, 5 are rigidly fixed in the ferrules 4, 4 with an adhesive or the like so that they will not slip off during use.

The optical adapter 6 is made of synthetic resin and, as shown in FIGS. 3 to 11, has such shape as formed by two rectangular cylinders juxtaposed to and integral with each other. The optical adapter 6 is symmetrical about its longitudinal center axis.

The optical adapter 6 has insertion openings 31, 31, receiving cavities 32, 32 and connection openings 33, 33 contiguous in the order mentioned in an insertion direction of the ends of the respective optical fiber cables 5, 5 attached with the ferrule 4 or in a longitudinal direction.

The optical adapter 6 has locking portions 34, 34 and an engagement hole 35 (FIG. 4) formed on its outer upper and lower walls and further has taper surfaces 36, 36 (FIG. 4) and a groove 37, both extending longitudinally. Denoted 38 is a recess formed on the outer wall of the optical adapter 6 at the side opposite the groove 37.

The insertion openings 31, 31 are circular holes formed in one end surface (proximal end surface) in the longitudinal direction of the optical adapter 6 and communicate to the receiving cavities 32, 32. Through the insertion openings 31, 31 are inserted the ends of the optical fiber cables 5, 5. The insertion openings 31, 31 have a diameter slightly larger than that of the flanges 27, 28 and are juxtaposed in a width direction of the optical adapter 6.

The receiving cavities 32, 32 have a length larger than the longitudinal length of the ferrules 4, 4 so that the distal ends of the small diameter portions 25 of the inserted ferrules 4, 4 do not protrude outside the connection openings 33, 33. (The tip ends of the ferrules 4, 4 are in this way prevented from damage. The end surfaces of the exposed POFs 21 are also protected.) The receiving cavities 32, 32 have the same diameter as that of the insertion openings 31, 31 and of the connection openings 33, 33 and are internally provided at an intermediate length thereof with ring-shaped circumferential stoppers 39, 39.

The flanges 27, 27 of the ferrules 4, 4 abut against the stoppers 39, 39 each of which has a circumferential taper at the side toward the flange 27.

The connection openings 33, 33 are circular holes formed in the other end surface (distal end surface) in the longitudinal direction of the optical adapter 6 and allows connection to the optical/electrical connector 11 (FIG. 2). The connection openings 33, 33 are juxtaposed in the width direction of the optical adapter 6 and communicate to the receiving cavities 32, 32.

The locking portions 34, 34 are located on opposite sides of the groove 37, toward the insertion openings 31, 31 and are cut in the outer wall of the optical adapter 6 to project in a cantilever manner into the receiving cavities 32, 32 to make contact with the flanges 27, 27 of the ferrules 4, 4 and lock the ferrules from slipping off rearwardly.

The engagement hole 35 (FIG. 4) is transversely formed, through the outer wall opposite the wall where the locking portions 34, 34 are formed, to communicate to the receiving cavities 32, 32. Into the engagement hole 35 is fitted the holder 8 to engage with the flanges 27, 27 of the ferrules 4, 4 and double lock the ferrules inside the receiving cavities 32, 32.

The taper surfaces 36, 36 take the form as if obtained by chamfering the transversely opposite edges of the optical adapter 6 at the side where the engagement hole 35 is provided, and prevent the optical adapter 6 from being fitted upside down into the electrical connector 7.

The groove 37 extends longitudinally at a center of the outer wall of the optical adapter 6, between the locking portions 34, 34 and serves as a guide.

The electrical connector 7, as shown in FIG. 3, includes a plurality of electrical terminals 41 (only two are shown), an electrical housing 42 of synthetic resin and terminal-locking spacers 43, 43 insertable into the electrical housing 42.

The electrical terminal 41 is of a female type and is formed from a conductive thin metal plate to have a box-like electrical contact portion and a wire connecting portion. The electrical contact portion is provided with a resilient locking piece 44, and the wire connecting portion is crimped on and connected to the stripped end of a wire 45.

The spacers 43, 43 are substantially T-shaped when viewed from above, and their longitudinal portions 46 are made longer than their transverse portions 47 to, when inserted into the electrical housing 42, double lock the electrical terminals 41 in a row arrangement in the electrical housing 42.

The electrical housing 42, as shown in FIGS. 3 and 12 to 17, is provided in box-like form and has a plurality of terminal receiving cavities 50 and an optical adapter mount section 51 for receiving the optical adapter 6. The electrical housing 42 is longer in width direction, i.e., in size from the left to right side walls 54, 55 than in longitudinal direction, i.e., in size from the front to rear end surfaces 52, 53.

The electrical housing 42 is provided on its upper wall 56 with a locking arm 57, guide ribs 58, 58 and 59, and an arch-like portion 60 and on its lower wall 61 with guide ribs 62, 62 and a tongue-like projection 63 (FIG. 12) contiguous to the rear end surface 53. The left side wall 54 is formed with insertion portions 64, 64 for the spacers 43, 43.

The terminal receiving cavities 50 are arranged at equal intervals in two, upper and lower rows, six receiving cavities for each row (though not limited to this number). Each terminal receiving cavity 50 opens at the front end surface 52 and the rear end surface 53, and through the rear end surface 53 side opening is inserted the related electrical terminal 41.

Denoted 67 (FIG. 17) is a locking shoulder which engages with the locking piece 44 of the electrical terminal 41 to prevent the electrical terminal 41 from slipping off rearwardly. The locking shoulder 67 is provided at an intermediate length of the upper wall 56 or lower wall 61 of the terminal receiving cavity 50.

Denoted 68 (FIG. 17) is a stopper which is located at the front end surface 52 side of the terminal receiving cavity 50 and which abuts against the electrical contact portion of the electrical terminal 41. In the vicinity of the stopper 68 is formed an opening 69 which is used when removing the electrical terminal 41 or inspecting for an incomplete insertion of the electrical terminal 41.

Denoted 70 (FIG. 17) is a slit for receiving the longitudinal portion 46 of the related spacer 43. If, following the insertion of the electrical terminal 41 into the terminal receiving cavity 50, the spacer 43 is placed into the slit 70, the electrical terminal 41 is double locked by the spacer 43 and the locking shoulder 67.

The optical adapter mount section 51 has an empty space extending from the rear end surface 53 to the front end surface 52 of the electrical housing 42 and capable of receiving the optical adapter 6.

The optical adapter mount section 51 has a guide rib 73 for guiding the optical adapter 6, a convex portion 74 (FIGS. 12, 16) which engages in the recess 38 (FIG. 4) of the optical adapter 6, and an engagement hole 75 (FIG. 16) for fitting the holder 8. The wall having the front end surface 52 is formed with connection openings 76, 76 communicating to the optical adapter mount section 51 and also serves as a stopper for the optical adapter 6.

The guide rib 73 is formed at a center on the upper inner wall (FIG. 12) of the optical adapter mount section 51 to extend in the direction from the rear end surface 53 to the front end surface 52 (in the fitting direction of the optical adapter 6). The guide rib 73 is of such size as to engage in the groove 37 of the optical adapter 6.

Figure 4:
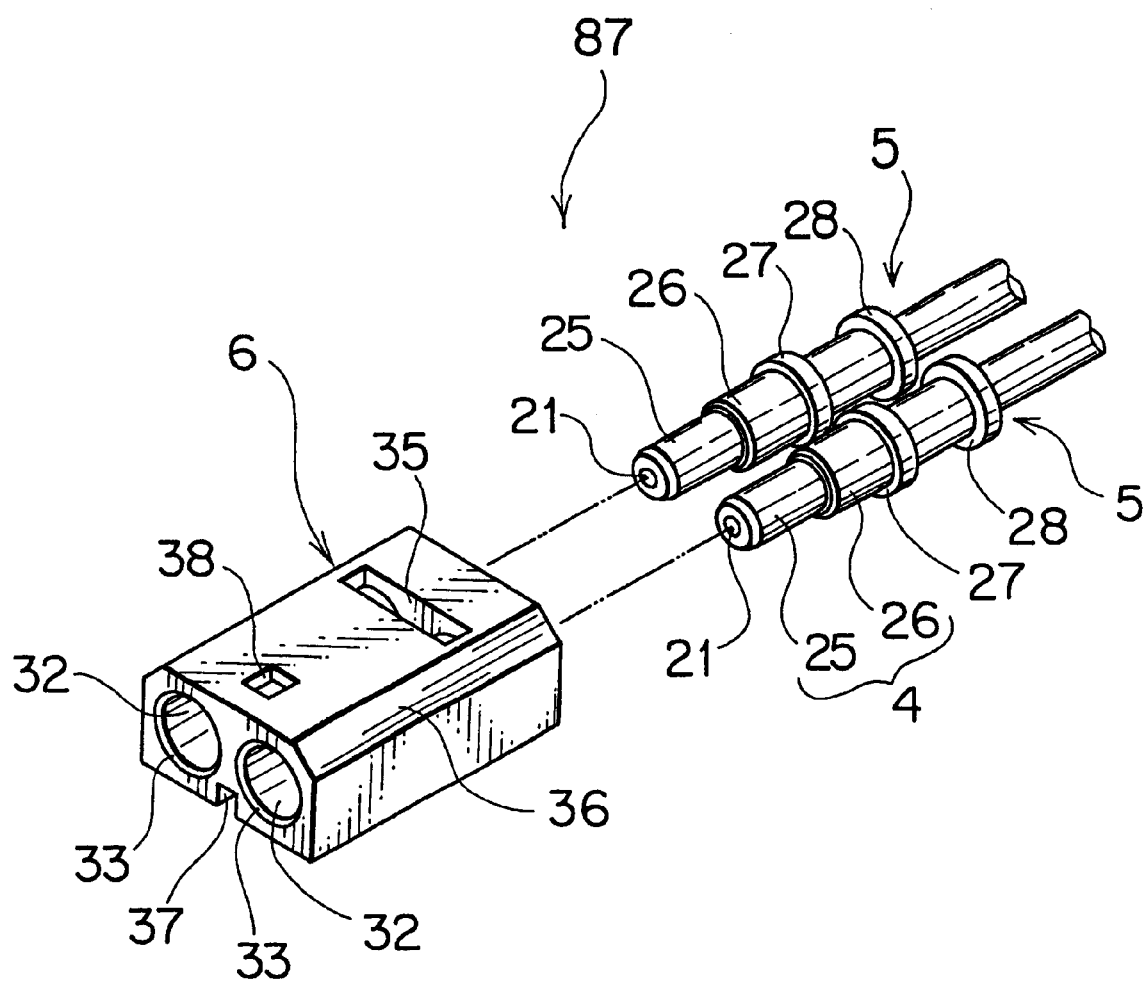
FIG. 4 is an exploded perspective view of an optical connector as in FIG. 3.
Figure 5:
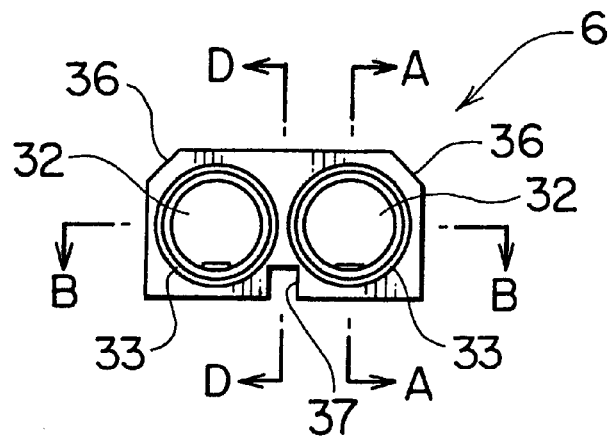
FIG. 5 is a front view of an optical adapter as in FIG. 1.
Figure 6:
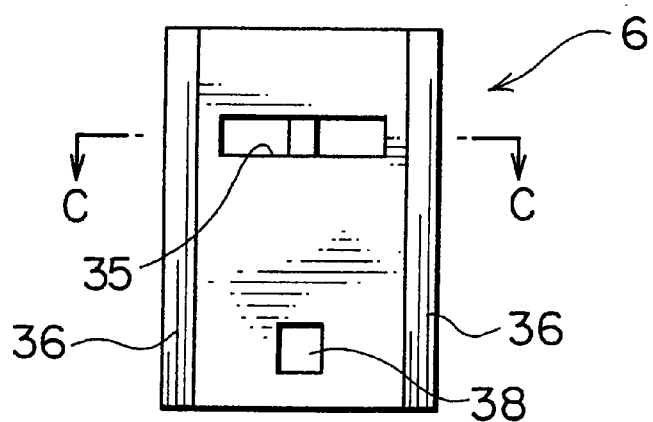
FIG. 6 is a plan view of the optical adapter.
Figure 7:
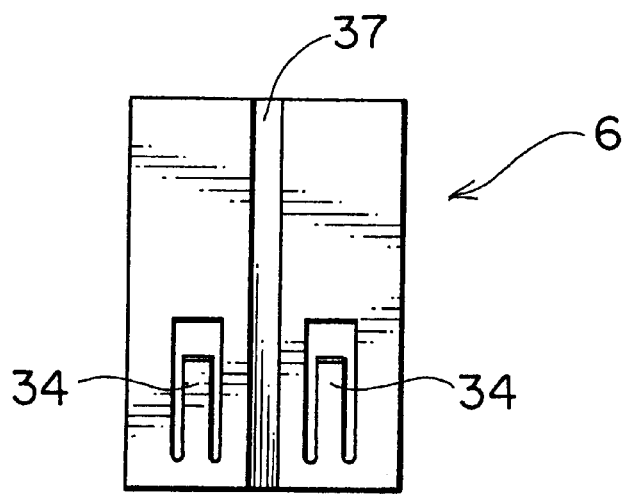
FIG. 7 is a bottom view of the optical adapter.
Figure 8:
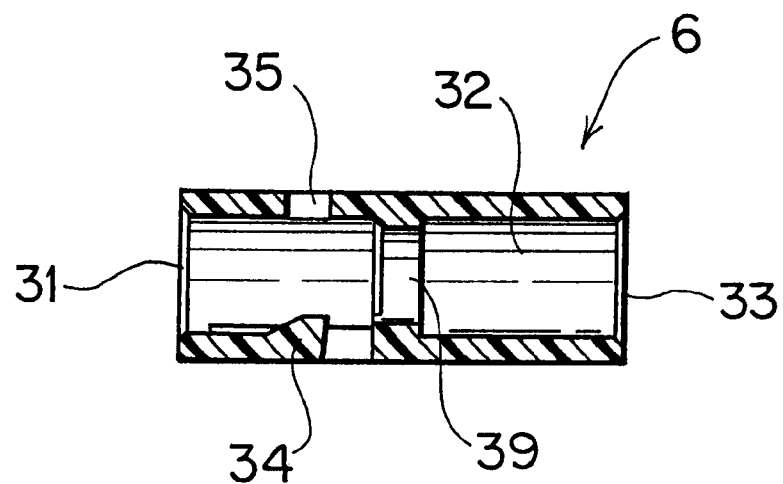
FIG. 8 is a sectional view taken along the line A—A of FIG. 5.
Figure 9:
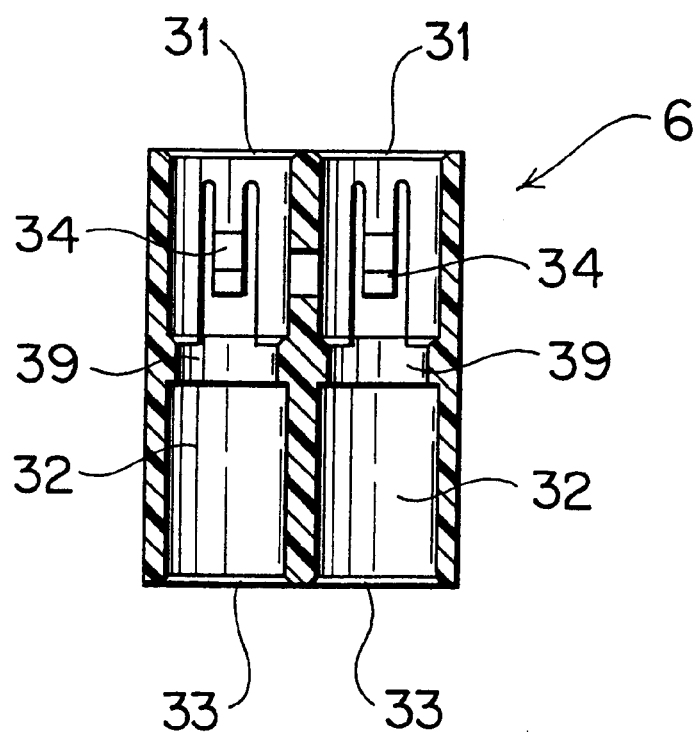
FIG. 9 is a sectional view taken along the line B—B of FIG. 5.
Figure 10:
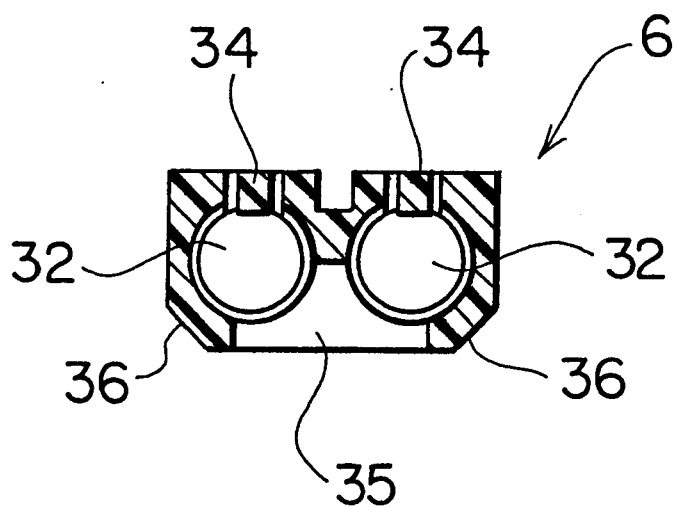
FIG. 10 is a sectional view taken along the line C—C of FIG. 6.
Figure 11:
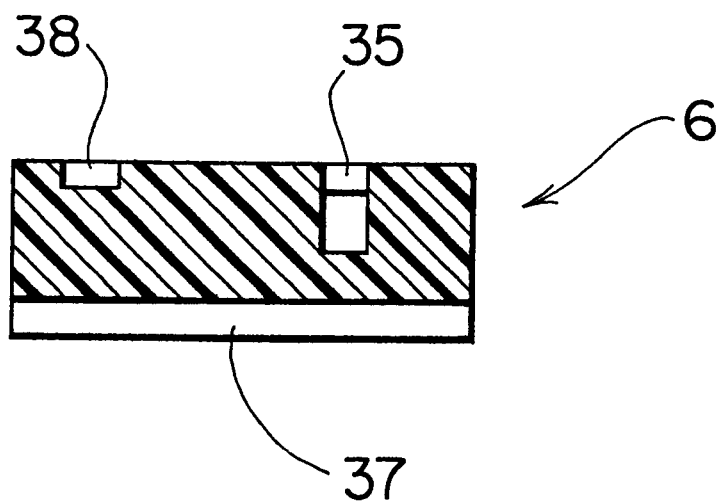
FIG. 11 is a sectional view taken along the line D—D of FIG. 5.

The convex portion 74 is tapered (FIG. 16) for easy engagement in the recess 38 (FIG. 4). Denoted 77 is a mold removing hole for forming the convex portion 74.

The engagement hole 75 (FIG. 16) at the optical adapter mount section 51 is of the same size as the engagement hole 35 (FIG. 6) of the optical adapter 6. The holder 8 is inserted through the engagement hole 75 and the engagement hole 35 (FIGS. 4, 6) to come into engagement with the flanges 27, 27 of the ferrules 4, 4.

The connection openings 76, 76 at the optical adapter mount section 51 are circular through holes and have the same diameter and the same spacing therebetween as the connection openings 33, 33 (FIG. 5) of the optical adapter 6.

The locking arm 57 rises upwardly from the upper wall 56 of the electrical housing 42 at the front end surface 52 side and is bent at about 90 to extend close to the rear end surface 53.

The locking arm 57 has resiliency and has tapered claw-like locking projections 78, 78 on its upper surface. The locking projections 78, 78 are located at an intermediate length of the locking arm 57.

The locking arm 57 further has a pressing portion 79 formed thereon at a position close to its tip end which projects in the same direction as the locking arms 78, 78. The locking arm 57 is tapered at the front end and becomes thinner toward the tip end.

Figure 12:
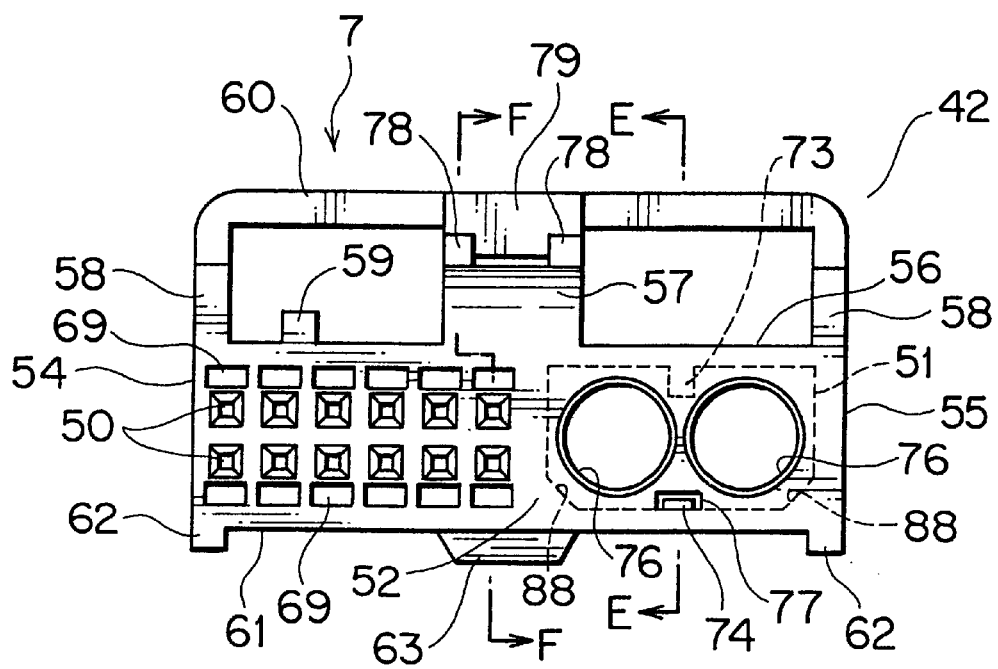
FIG. 12 is a front view of an electrical connector as in FIG. 1.
Figure 13:
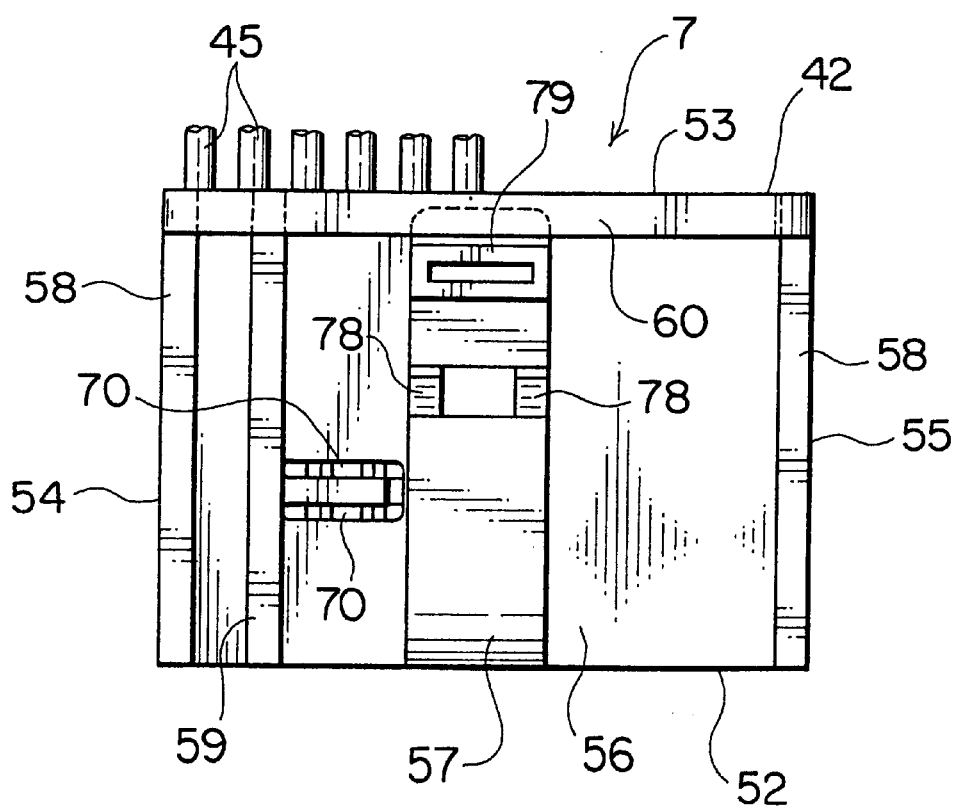
FIG. 13 is a plan view of the electrical connector.
Figure 14:
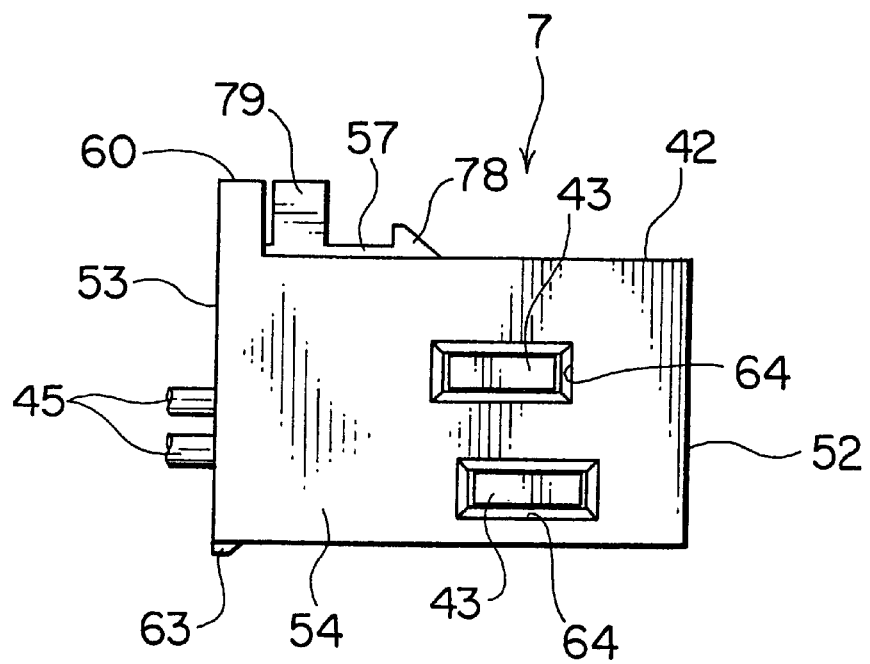
FIG. 14 is a left side view of the electrical connector.
Figure 15:
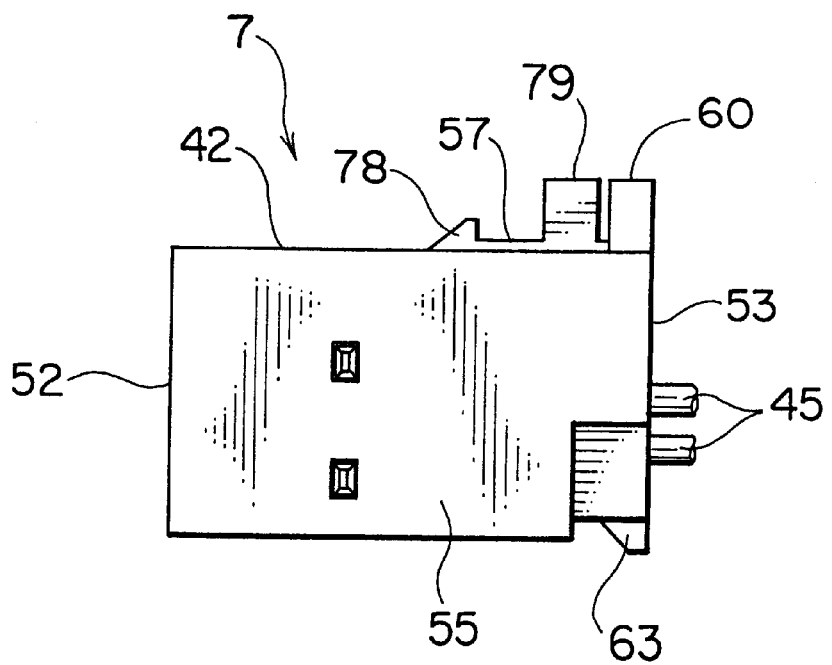
FIG. 15 is a right side view of the electrical connector.

The guide ribs 58, 58 are provided at opposite side ends of the electrical housing upper wall 56 to project at right angles to the upper wall 56 and extend longitudinally in the direction from the front end surface 52 to the rear end surface 53. The guide ribs 58, 58, as shown in FIG. 12, have their upper ends flush with the upper surface of the locking arm 57 on which the locking projections 78, 78 are formed.

The guide rib 59 provided on the upper wall 56 of the electrical housing 42 has approximately half the height of the guide ribs 58, 58 and extends in parallel with same.

Figure 16:
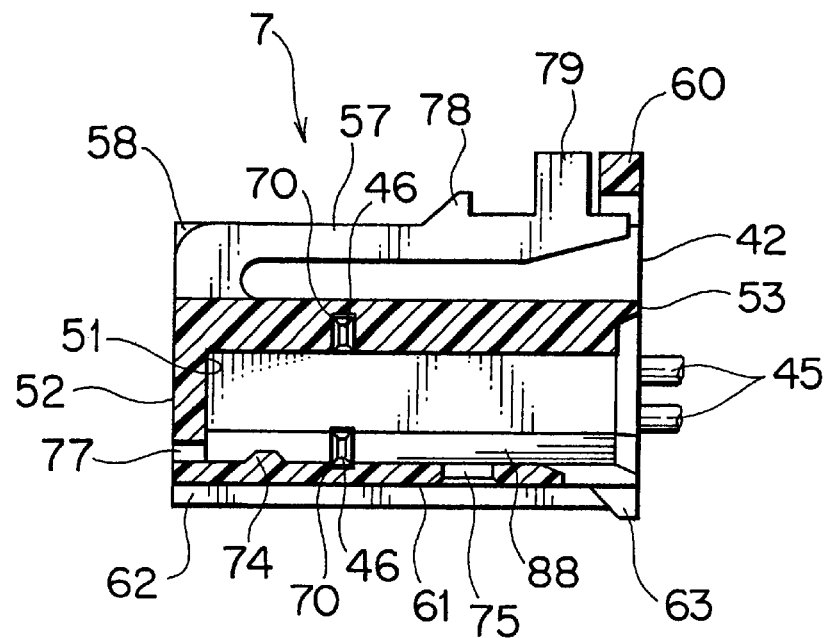
FIG. 16 is a sectional view taken along the line E—E of FIG. 12.
Figure 17:
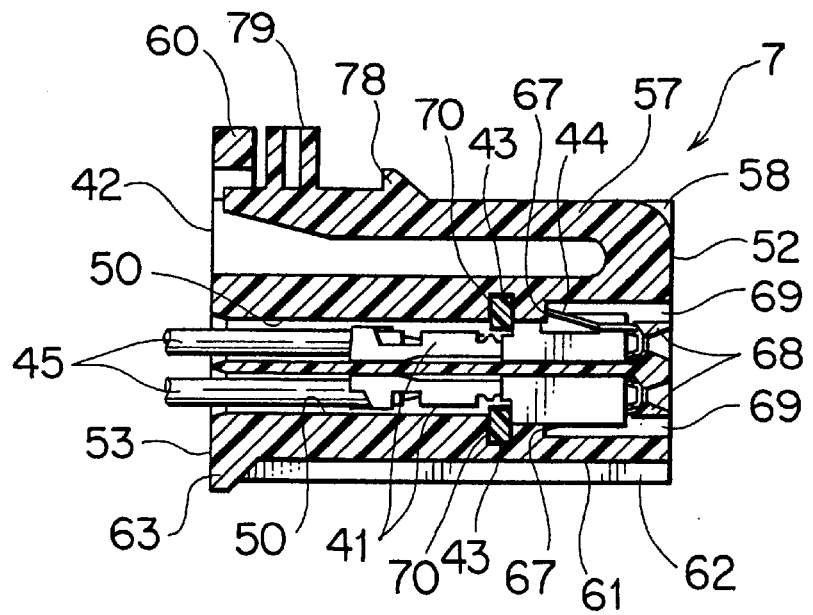
FIG. 17 is a sectional view taken along the line F—F of FIG. 12.

The arch portion 60 is of small width, U-shaped and provided on the upper wall 56 of the electrical housing 42 and has its rear end surface flush with the rear end surface 53. The opposite side ends of the arch portion 60 are contiguous to the left and right side walls 54 and 55. The arch portion 60, as shown in FIG. 16, is flush with the upper end of the pressing portion 79 of the locking arm 57 and protects the locking arm 57.

The guide ribs 62, 62 are provided at opposite side ends of the lower wall 61 of the electrical housing 42 to project at right angles to the lower wall 61, extend in the direction from the front end surface 52 to the rear end surface 53, and are contiguous to the left and right side walls 54 and 55. The guide ribs 62, 62 have a slightly smaller height than the guide rib 59 located on the upper wall 56.

Each insertion portion 64 (FIG. 3) has a slit 70 and a recess 80 formed around the slit 70 for receiving the transverse portion 47 of the related spacer 43. The recess 80 has such a depth that the transverse portion 47, when the spacer 43 is inserted, becomes flush with the left side wall 54.

The holder 8, as shown in FIG. 3, is a one-piece locking member and includes a shank 83 and a pair of resilient locking arms 84, 84 provided at opposite sides of the shank 83. Each resilient locking arm 84 is formed at the upper side with a curved depression 85 which conforms to the outside shape of the large diameter portion 26 of the respective ferrule 4. The holder 8 is fitted into the engagement hole 75 (FIG. 16) through depression of its resilient locking arms 84, 84. The resilient locking arms 84, 84 come into engagement with the flanges 27, 27 of the respective ferrules 4, 4.

The holder 8 serves to lock not only the ferrules 4, 4, but also the optical adapter 6 in position in the electrical housing 42.

With the construction as mentioned above, the optical/electrical connector 1 is assembled as follows.

Figure 18:
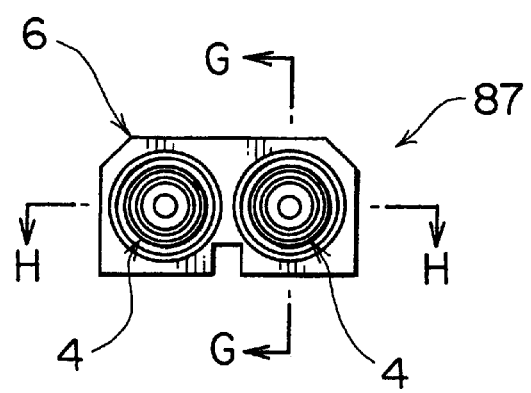
FIG. 18 is a front view of the optical connector as in FIG. 3.
Figure 19:
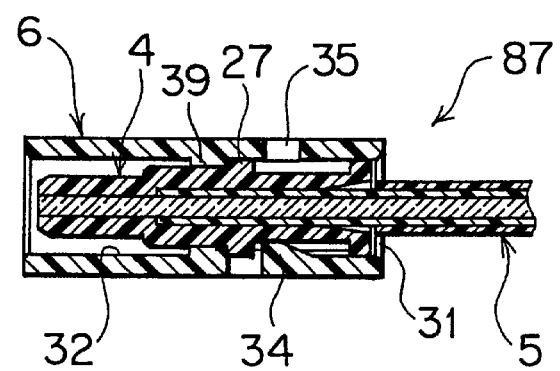
FIG. 19 is a sectional view taken along the line G—G of FIG. 18.
Figure 20:
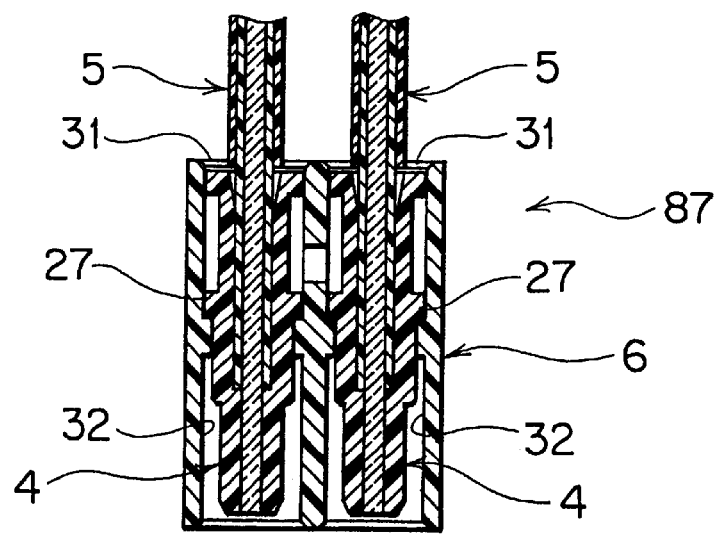
FIG. 20 is a sectional view taken along the line H—H of FIG. 18.
Figure 21:
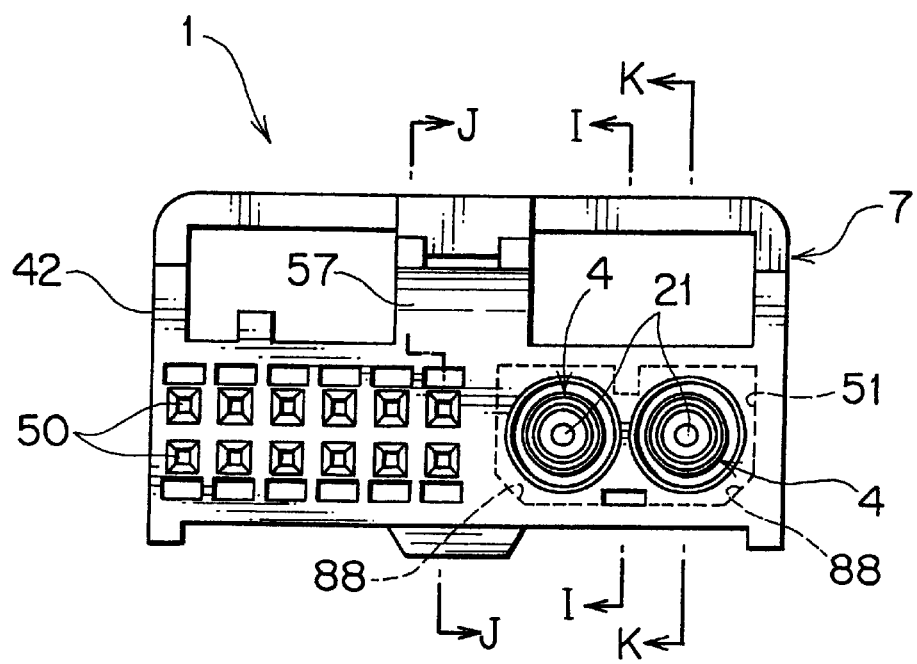
FIG. 21 is a front view of the optical/electrical connector as in FIG. 3.
Figure 22:
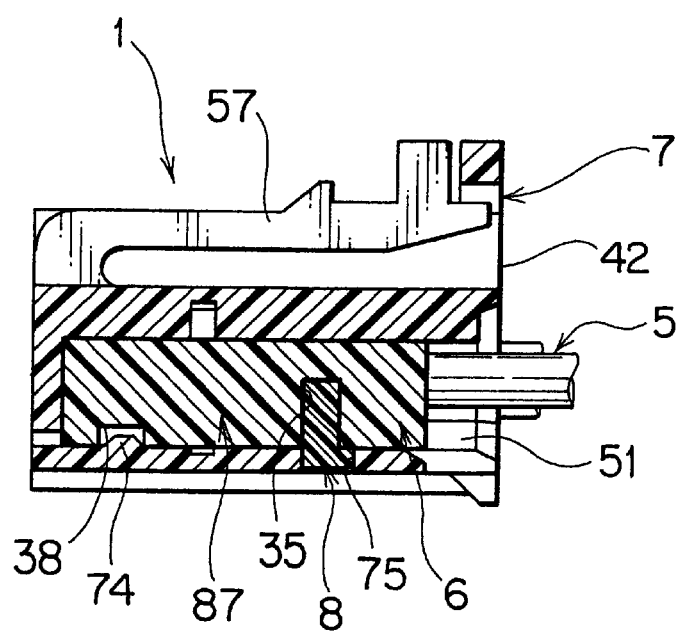
FIG. 22 is a sectional view taken along the line I—I of FIG. 21.
Figure 23:
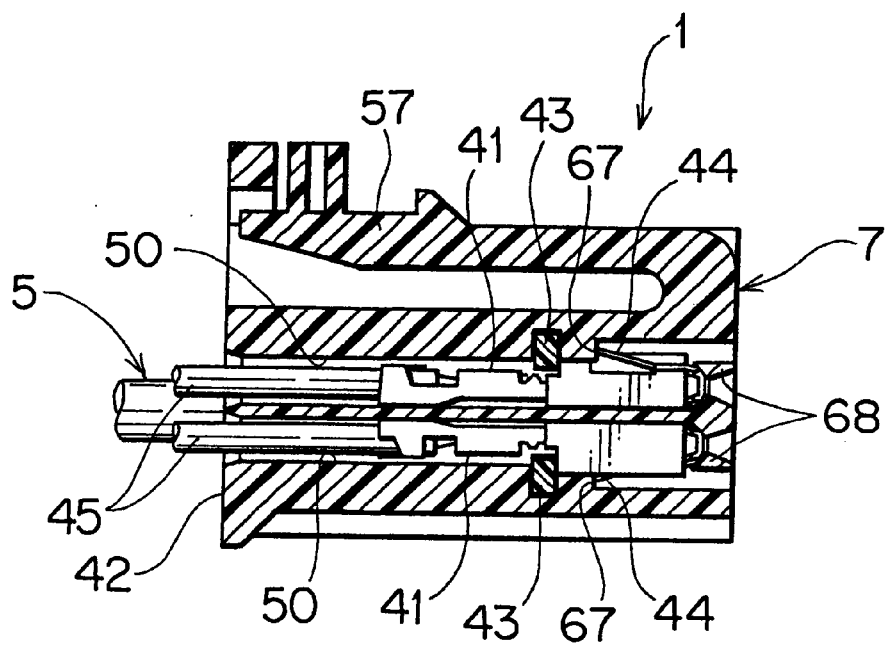
FIG. 23 is a sectional view taken along the line J—J of FIG. 21.
Figure 24:
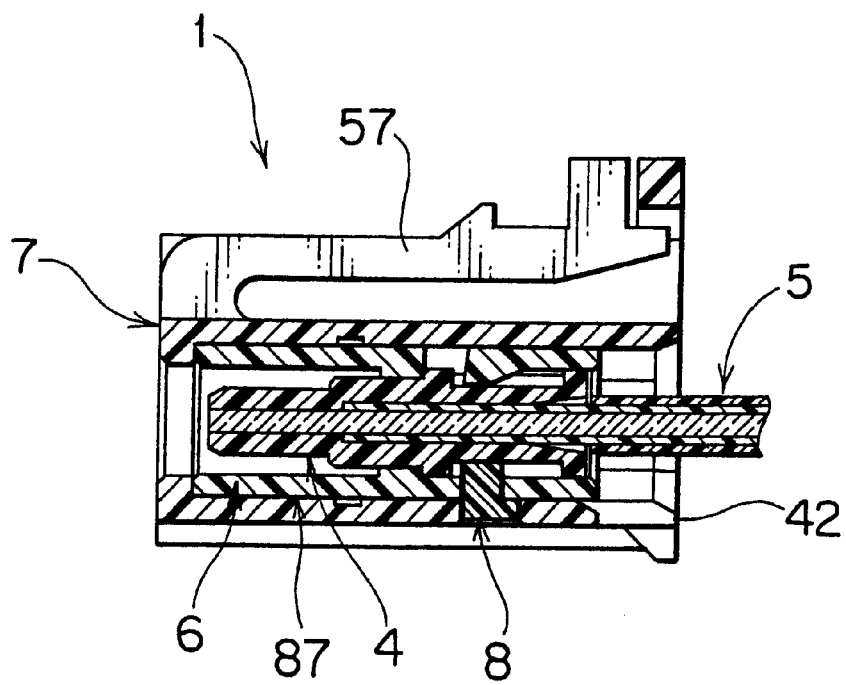
FIG. 24 is a sectional view taken along the line K—K of FIG. 21.

First, as shown in FIGS. 18 to 20, the optical fiber cables 5, 5 attached at the end with the ferrule 4 are inserted and mounted in the optical adapter 6 to assemble the optical connector 87.

In other words, the optical fiber cables 5, 5 are pushed through the insertion openings 31, 31 into the receiving cavities 32, 32 until the flanges 27, 27 of the ferrules 4, 4 come into contact with the stoppers 39, 39.

The locking portions 34, 34, if the optical fiber cables 5, 5 fully advance into the receiving cavities 32, 32, come from their outwardly deflected position back to their original position to engage with the flanges 27, 27 of the ferrules 4, 4 and restrict the movement of the optical fibers 5, 5 inside the receiving cavities 32, 32.

The optical connector 87, after completion of its assembly, is mounted in the electrical connector 7 as shown in FIGS. 21 to 24. The electrical terminals 41 are in advance inserted into their respective terminal receiving cavities 50 of the electrical connector 7, although may alternatively be inserted afterward.

To briefly describe the insertion step of the electrical terminals 41, each electrical terminal 41 is pushed until its electrical contact portion abuts against the stopper 68 (FIG. 17) and received in position in the terminal receiving cavity 50.

During the above, the locking piece 44 of the electrical terminal 41 deflects inwardly and, when the electrical terminal 41 is fully inserted, restores its original position to engage with the locking shoulder 67. After all the electrical terminals 41 have been inserted, the spacers 43, 43 are inserted into the electrical housing 42 to thereby double lock the electrical terminals 41. The electrical connector 7 is thus provided with the electrical terminals 41.

If the optical connector 87 as obtained above is inserted into the electrical connector 7, the convex portion 74 (FIG. 22) inside the optical adapter mount section 51 engages in the recess 38 of the optical adapter 6 to lock the optical connector 87 in the electrical connector 7.

The optical adapter mount section 51 is provided with taper surfaces 88, 88 (FIG. 21) which cooperate with the taper surfaces 36, 36 (FIG. 5) of the optical adapter 6 to prevent the optical adapter 6 or the optical connector 87 from being inserted upside down into the electrical connector 7.

Thereafter, the holder 8 is fitted and inserted through the engagement hole 75 of the electrical connector 7 and the engagement hole 35 of the optical adapter 6, so that the optical fibers 5, 5 are double locked in position in the optical adapter 6 and the optical adapter 6 is double locked in position in the electrical connector 7. The optical/electrical connector 1 is thus assembled.

The optical connector 2 will now be described.

Figure 26:
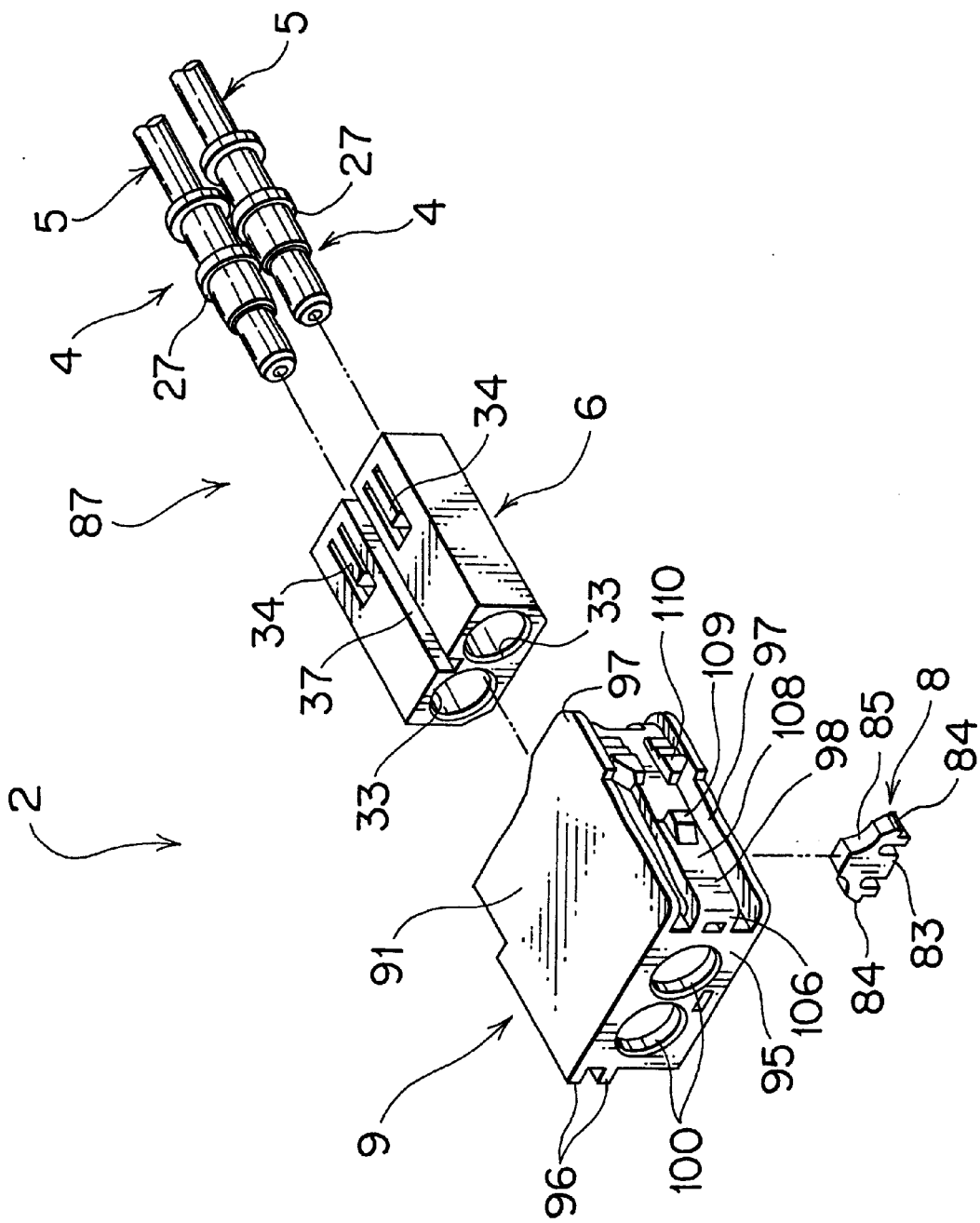
FIG. 26 is an exploded perspective view of the female optical connector, shown from a direction opposite that in FIG. 25.
Figure 27:
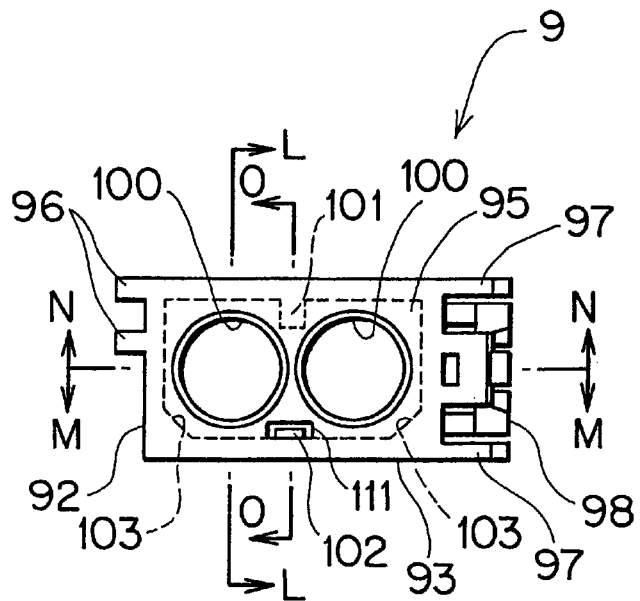
FIG. 27 is a front view of an optical adapter cover as in FIG. 1.
Figure 28:
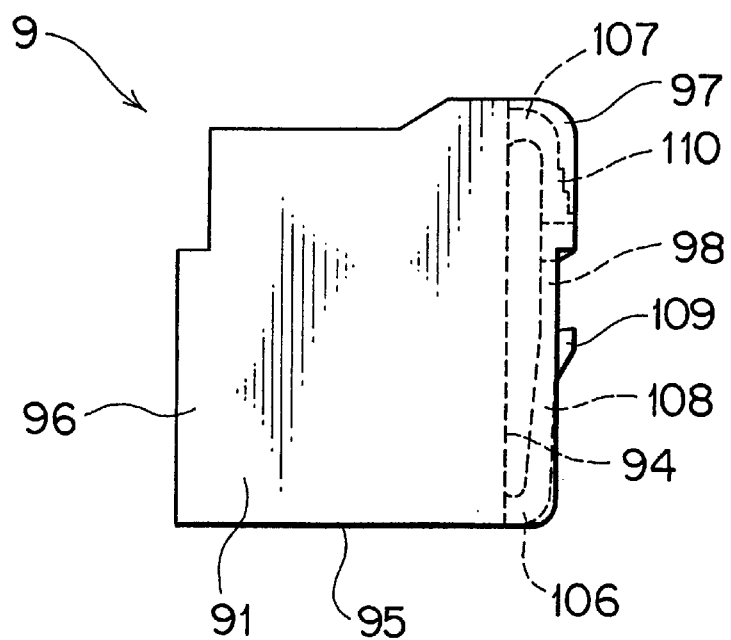
FIG. 28 is a plan view of the optical adapter cover.
Figure 29:
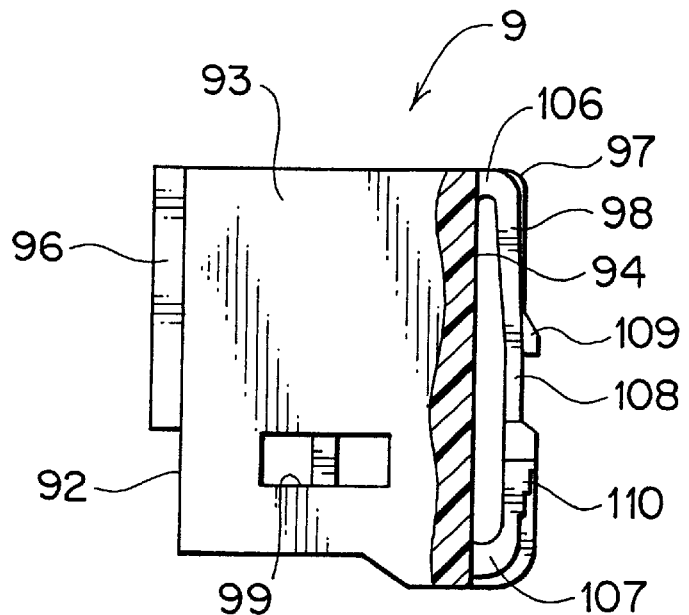
FIG. 29 is a bottom view of the optical adapter cover.
Figure 30:
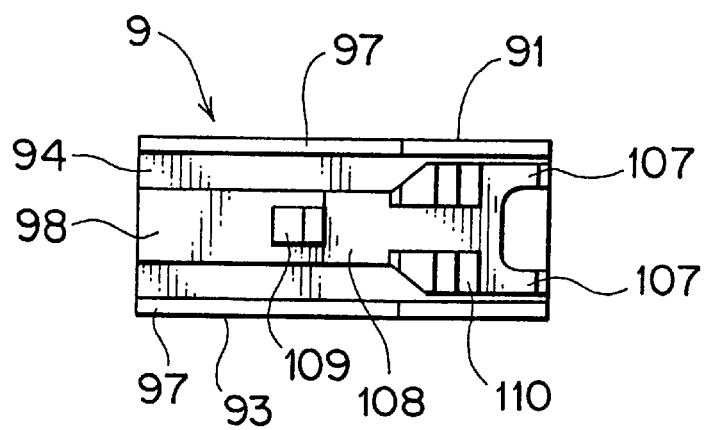
FIG. 30 is a right side view of the optical adapter cover.
Figure 31:
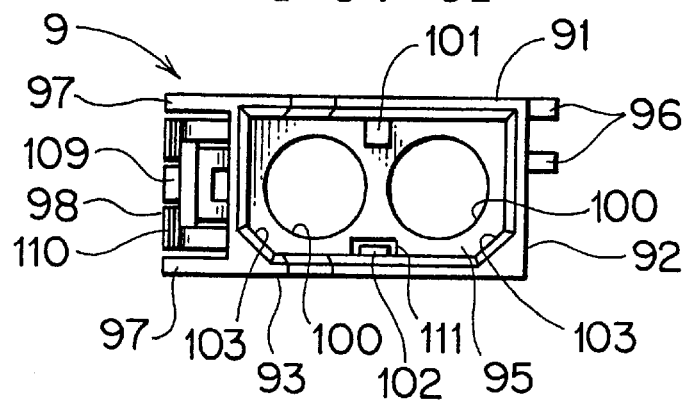
FIG. 31 is a r ear view of the optical adapter cover.
Figure 32:
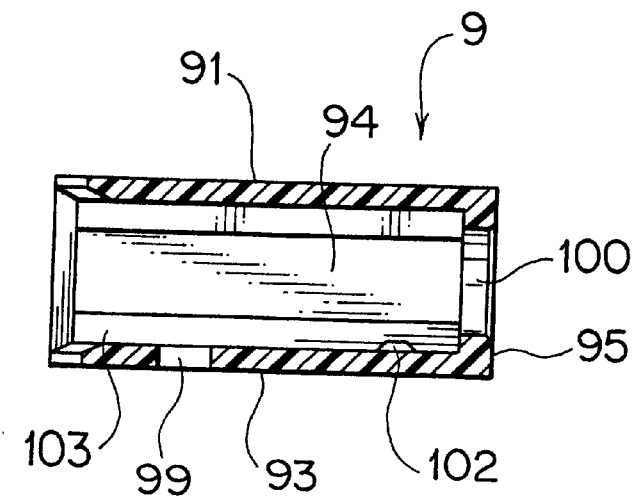
FIG. 32 is a sectional view taken along the line L—L of FIG. 27.
Figure 33:
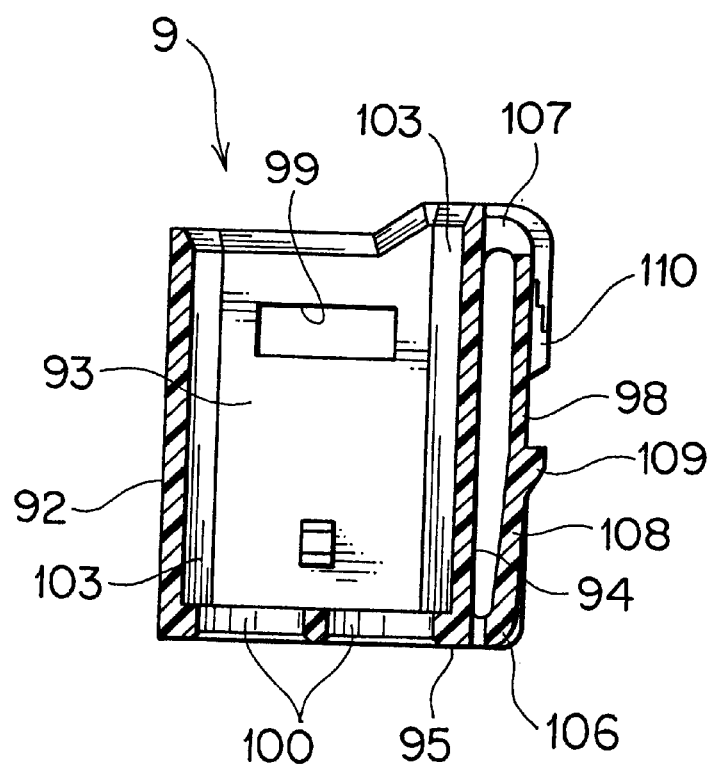
FIG. 33 is a sectional view take along the line M—M of FIG. 27.
Figure 34:
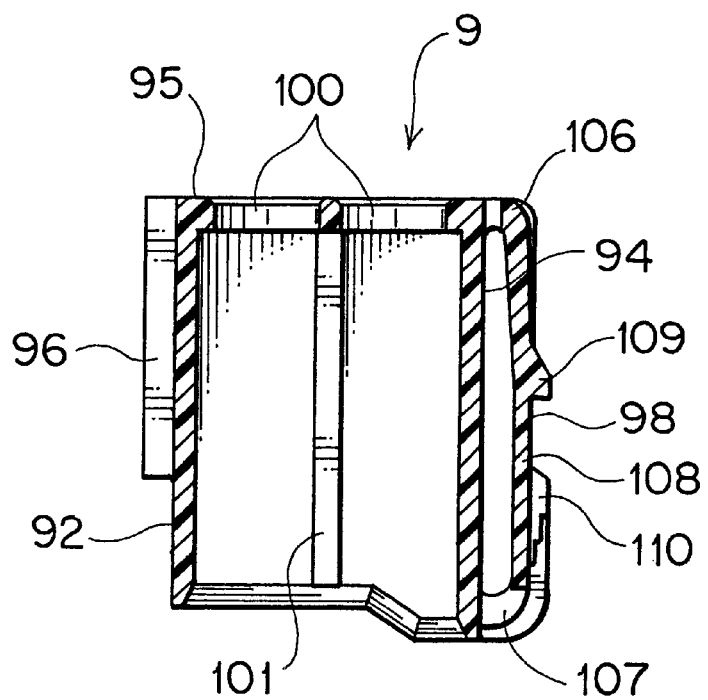
FIG. 34 is a sectional view taken along the line N—N of FIG. 27.
Figure 35:
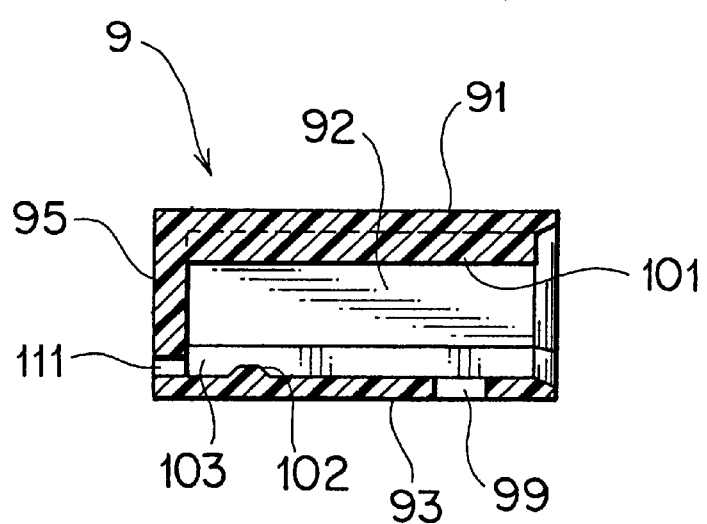
FIG. 35 is a sectional view taken along the line O—O of FIG. 27.

In FIGS. 25 and 26, the optical connector 2, as mentioned above, is of a female type and is constituted by the optical fiber cables 5, 5 attached at the end with the ferrule 4, the optical adapter 6, the optical adapter cover 9, and the holder 8. (The optical fiber cables 5, 5, the optical adapter 6 and the holder 8 each has the same structure as described above, and their detailed description will be omitted here.)

The optical adapter cover 9 is made of synthetic resin and, as shown in FIGS. 25 to 35, has a box-like shape for receiving therein the optical adapter 6.

The optical adapter cover 9 has four walls in one piece, arranged in a circumferential direction relative to the longitudinal or insertion direction of the optical adapter 6, i.e., an upper wall 91, a left side wall 92 contiguous to the upper wall 91, a lower wall 93 contiguous to the left side wall 92 and a right side wall 94 contiguous to the lower and upper walls 93 and 91, as well as a front wall 95 integral with these four walls at their front end.

The upper and lower walls 91 and 93 of the optical adapter cover 9 are partially transversely cut out at their rear end. The cutout allows the optical adapter 6 to be partially exposed after the optical adapter is accommodated in the optical adapter cover 9. The cutout also contributes to an improved workability.

The left side wall 92 of the optical adapter cover 9 is formed with guide ribs 96, 96. The right side wall 94 is formed with guide ribs 97, 97 and a locking portion 98 located between the guide ribs 97, 97. The lower wall 93 is formed with an engagement hole 99 for fitting the holder 8.

The front wall 95 of the optical adapter cover 9 is provided with connection openings 100, 100 communicating to the interior of the optical adapter cover 9. The front wall 95 serves as a stopper for the optical adapter 6.

The optical adapter cover 9 is internally provided with the same empty space as that (FIG. 3) formed in the optical adapter mount section 51 and includes a guide rib 100 (FIG. 27) for guiding the optical adapter 6, a convex portion 102 engageable in the recess 38 (FIG. 4) of the optical adapter 6, and taper surfaces 103, 103 corresponding to the taper surfaces 36, 36 (FIG. 5) of the optical adapter.

The guide ribs 96, 96 project at right angles on the left side wall 92, one at the upper end to be flush with the upper wall 91 and the other at an intermediate height of the left side wall 92, and extend longitudinally. The guide ribs 96, 96 have a smaller size in width or transverse direction than the guide ribs 97, 97.

The guide ribs 97, 97 project at right angles on the right side wall 94 at the upper and lower ends to be flush with the upper and lower walls 91 and 93, respectively, and extend longitudinally. The guide ribs 97, 97 have a sufficient size in width or transverse direction to protect the locking portion 98.

The locking portion 98 is constituted by a forward base portion 106 rising at the front wall 95 side, rearward base portions 107, 107 rising at the rear end side of the right side wall 94, and a resilient portion 108 extending parallel to the right side wall 94 and bridging the forward base portion 106 and the rearward base portions 107, 107.

The resilient portion 108 has resiliency and is thinned at about an intermediate part thereof. The resilient portion 108 has a claw-like locking projection 109 and a pressing portion 110 with steps (FIG. 30), the former being formed on the outer surface thereof at the intermediate length, and the latter on the same surface toward the rearward base portions 107, 107.

Pressing down at the pressing portion 110 deflects the resilient portion 108 toward the right side wall 94 to disengage the locking projection 109.

The engagement hole 99 has the same size as the engagement hole 35 (FIG. 6) of the optical adapter 6. The holder 8, when fitted in the engagement hole 99, passes through the engagement hole 35 (FIG. 6) to come into engagement with the flanges 27, 27 of the ferrules 4, 4.

The connection openings 100, 100 are circular through holes and have the same diameter and the same spacing therebetween as the connection openings 33, 33 (FIG. 5) of the optical adapter 6.

The guide rib 101 is formed at a center on the upper inner wall 91 to extend longitudinally and is of such size as to engage in the groove 37 of the optical adapter 6.

The convex portion 102 is tapered (FIG. 32) for easy engagement in the recess 38 (FIG. 4) of the optical adapter 6. Denoted 111 is a mold removing hole for forming the convex portion 102.

The taper surfaces 103, 103 cooperate with the taper surfaces 36, 36 (FIG. 5) of the optical adapter 6 to prevent the optical adapter 6 and thus the optical connector 87 from being inserted upside down into the optical adapter cover 9.

With the construction as mentioned above, the optical connector 2 is assembled as follows.

Figure 36:
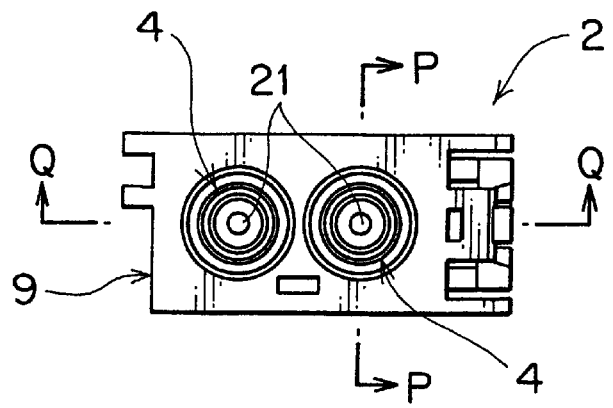
FIG. 36 is a front view of the optical connector of FIG. 25.
Figure 37:
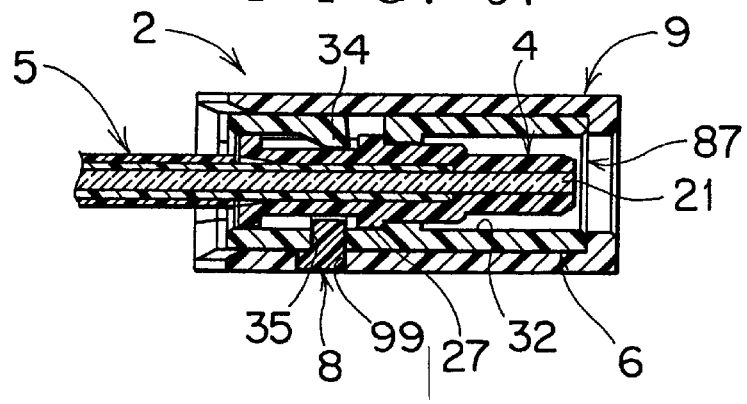
FIG. 37 is a sectional view taken along the line P—P of FIG. 36.
Figure 38:
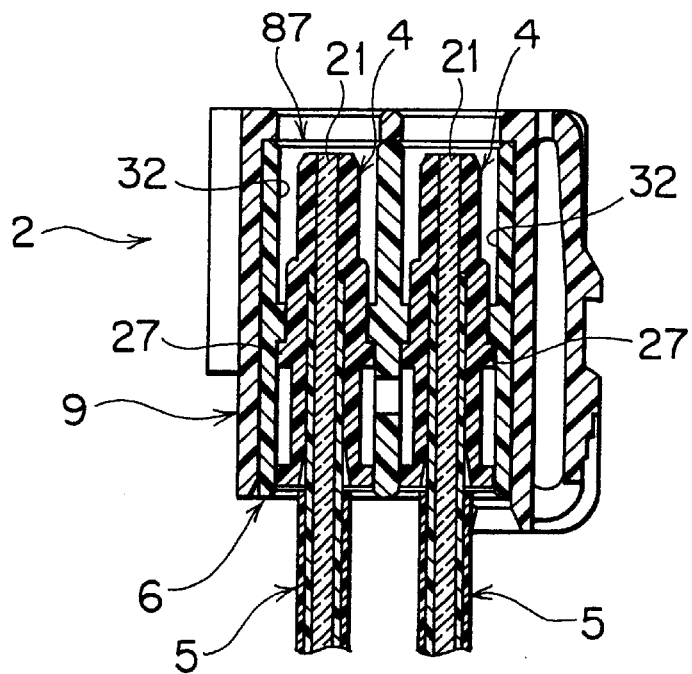
FIG. 38 is a sectional view taken along the line Q—Q of FIG. 36.

As shown in FIGS. 36 to 38, the optical fibers 5, 5 attached at the end with the ferrule 4 are first inserted into the optical adapter 6 to assemble the optical connector 87, and then the optical connector 87 is inserted into the optical adapter cover 9 to assemble the optical connector 2.

More specifically, if inserted into the optical adapter cover 9, the convex portion 102 (FIG. 35) of the optical adapter cover 9 engages in the recess 38 (FIG. 4) of the optical adapter 6 to lock the optical adapter 6 and thus the optical connector 87 in the optical adapter cover 9.

Thereafter, the holder 8 is fitted and inserted through the engagement hole 99 of the optical adapter cover 9 and the engagement hole 35 of the optical adapter 6, so that the optical fibers 5, 5 are double locked in position in the optical adapter 6 and the optical adapter 6 is double locked in position in the optical adapter cover 9. The optical connector 2 is thus assembled.

Description will now be made of the optical connector 3.

Figure 39:
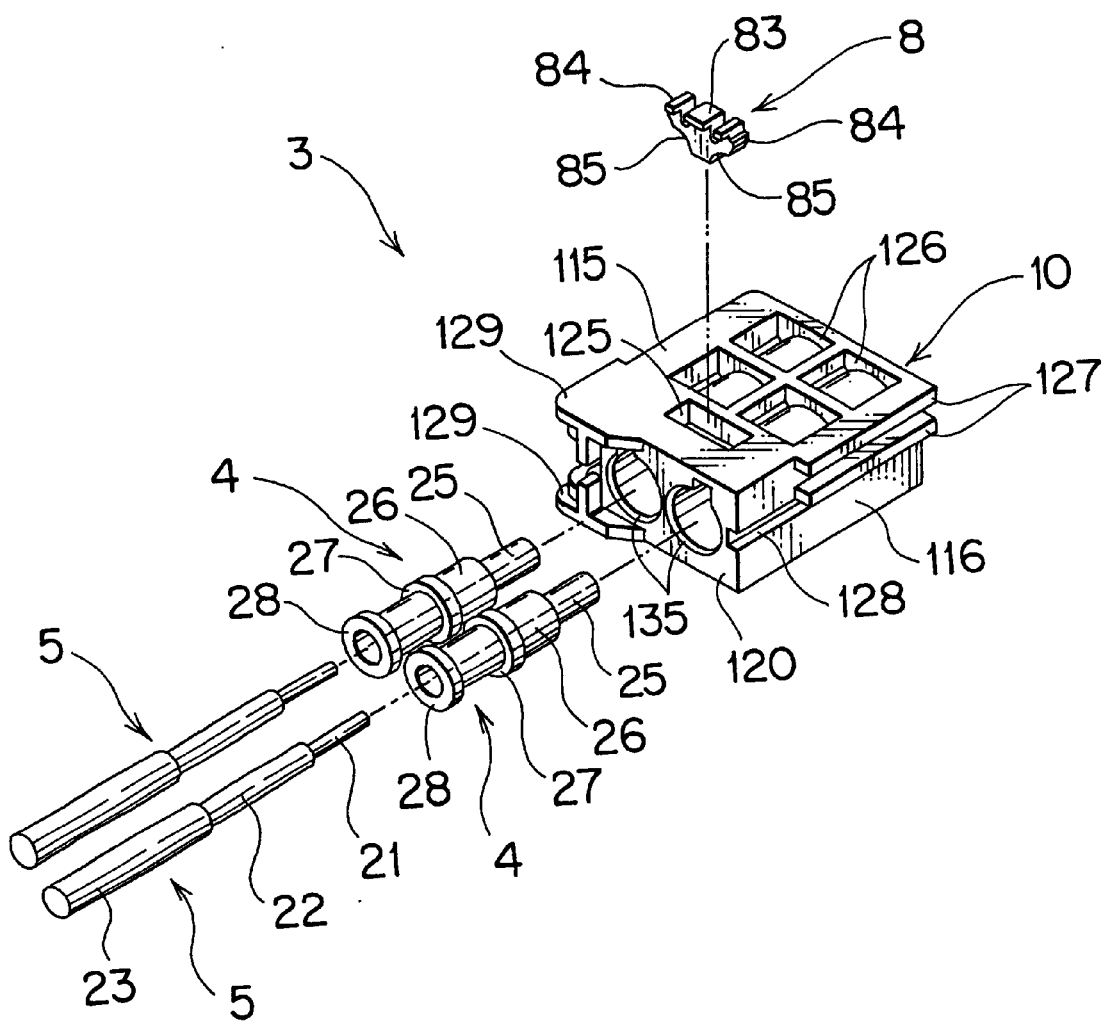
FIG. 39 is an exploded perspective view of another female optical connector as in FIG. 1, different from that as in FIG. 25.
Figure 40:
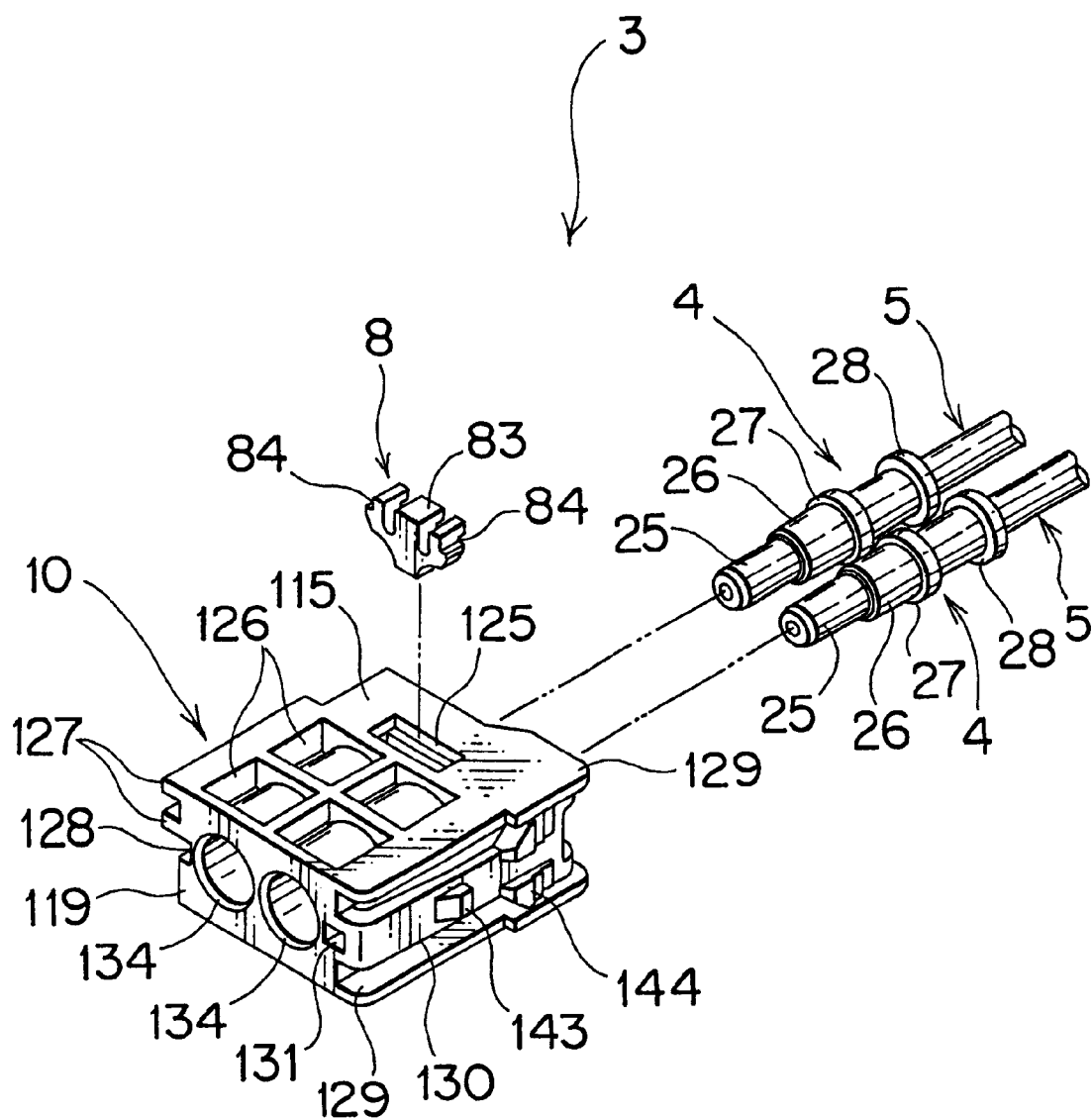
FIG. 40 is an exploded perspective view of the optical connector of FIG. 39, shown from a direction opposite that in FIG. 39.

In FIGS. 39 and 40, the optical connector 3, as mentioned above, is of a female type and is constituted by the optical fiber cables 5, 5 attached at the end with the ferrule 4, the optical housing 10, and the holder 8. (The optical fiber cables 5, 5 and the holder 8 each has the same structure as described above, and their description will be omitted here.)

The optical housing 10 is made of synthetic resin and, as shown in FIGS. 39 to 49, has a box-like shape for receiving therein the optical fiber cables 5, 5. The optical housing 10 has an upper wall 115, a left side wall 116 contiguous to the upper wall 115, a lower wall 117 contiguous to the left side wall 116 and a right side wall 118 contiguous to the lower and upper walls 117 and 115, as well as a front wall 119 integral with these walls at their front end. These walls of the optical housing 10 are substantially equal in size to the upper wall 91, left side wall 92, lower wall 93, right side wall 94 and front wall 95 (FIGS. 25 to 30) of the optical adapter cover 9, respectively. The optical housing 10 has substantially the same outside shape as that of the optical adapter cover 9 (FIG. 1).

The upper and lower walls 115 and 117 of the optical housing 10 are partially transversely cut out at their rear end. The optical housing 10 further has a rear wall 120 which is flush with the end surfaces of the upper and lower walls 115 and 117 at the cutout.

The upper wall 115 of the optical housing 10 is formed with an engagement hole 125 for fitting the holder 8 and four recesses 126. The left side wall 116 is formed with guide ribs 127, 127 and a groove 128. The right side wall 118 is formed with guide ribs 129, 129, a locking portion 130 located between the guide ribs, and a groove 131. The lower wall 117 is formed with four recesses 132 two of which contain a locking portion 133.

The front wall 119 of the optical housing 10 is provided with connection openings 134, 134. The rear wall 120 is provided with insertion openings 135, 135. The optical housing 10 has receiving cavities 136, 136 formed therein.

The engagement hole 125 has the same size as the engagement hole 35 (FIGS. 4, 6) of the optical adapter 6. If fitted in the engagement hole 125, the holder 8 comes into engagement with the flanges 27, 27 of the ferrules 4, 4.

The four recesses 126 serve to make a reduction in weight or the like and are curved at their bottom to conform to the shape of the receiving cavities 136, 136 defined therebelow.

The guide ribs 127, 127 project at right angles on the left side wall 116, one at the upper end to be flush with the upper wall 115 and the other at an intermediate height of the left side wall 116, and extend longitudinally in a fitting direction of the optical fiber cables 5, 5 attached with the ferrule 4. The guide ribs 127, 127 have a smaller size in width or transverse direction than the guide ribs 129, 129.

The groove 128 serves to make a reduction in weight or the like and extends longitudinally at an intermediate height of the left side wall 116.

The guide ribs 129, 129 project at right angles on the right side wall 118 at the upper and lower ends to be flush with the upper and lower walls 115 and 117, respectively, and extend longitudinally. The guide ribs 129, 129 have a sufficient size in width or transverse direction to protect the locking portion 130.

The locking portion 130 is constituted by a forward base portion 140 rising at the front wall 119 side, rearward base portions 141, 141 rising at the rear wall 120 side, and a resilient portion 142 extending parallel to the right side wall 118 and bridging the forward base portion 140 and the rearward base portions 141, 141.

The resilient portion 142 has resiliency and is thinned at about an intermediate part thereof. The resilient portion 142 has a claw-like locking projection 143 and a pressing portion 144 with steps, the former being formed on its outer surface at the intermediate length, and the latter on the same surface toward the rearward base portions 141, 141.

Pressing down at the pressing portion 144 deflects the resilient portion 142 toward the right side wall 118 to disengage the locking projection 143.

The groove 131 (FIGS. 40, 41) serves to make a reduction in weight or the like and extends longitudinally at an intermediate height of the right side wall 118.

The four recesses 132 (FIGS. 43, 46) serve to make a reduction in weight or the like and are curved at their bottom to conform to the shape of the receiving cavities 136, 136 defined thereabove.

The locking portion 133 (FIG. 43) is located inside the recesses 132, 132 at the side closer to the rear wall 120. The locking portion 133 includes a resilient cantilever projection defined by a U-shaped slit made in the bottom of the related recess 132, which is capable of engaging with the flange 27 of the related ferrule 4 to prevent the ferrule from coming off rearwardly. The locking portion 133 projects at the front end into the receiving cavity 136.

The connection openings 134, 134 are circular through holes and have the same diameter and the same spacing therebetween as the connection openings 33, 33 (FIG. 5) of the optical adapter 6. The connection openings 134, 134 communicate to the respective receiving cavities 136, 136.

The insertion openings 135, 135 are circular holes communicating to the respective receiving cavities 136, 136, and the ends of the optical fiber cables 5, 5 are inserted through the insertion openings 135, 135 into the receiving cavities 136, 136. The insertion openings 135, 135 have a diameter slightly larger than that of the flanges 27, 28 and are juxtaposed in a width direction of the optical housing 10.

Figure 46:
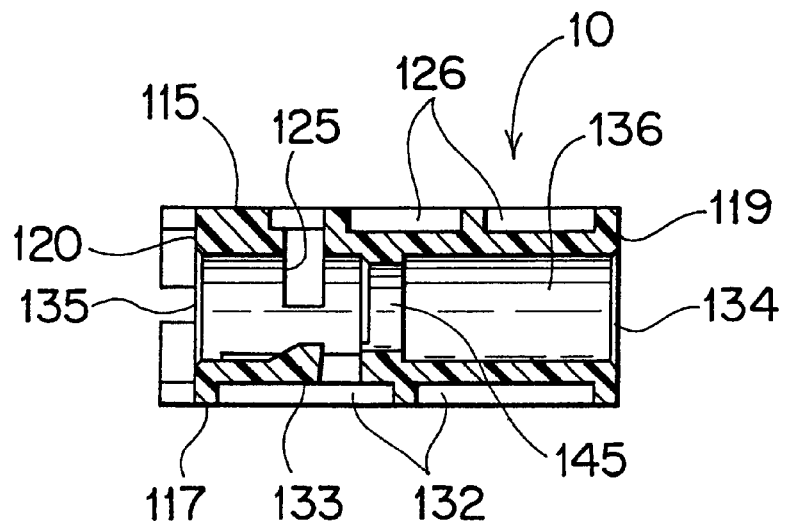
FIG. 46 is a sectional view taken along the line R—R of FIG. 41.
Figure 47:
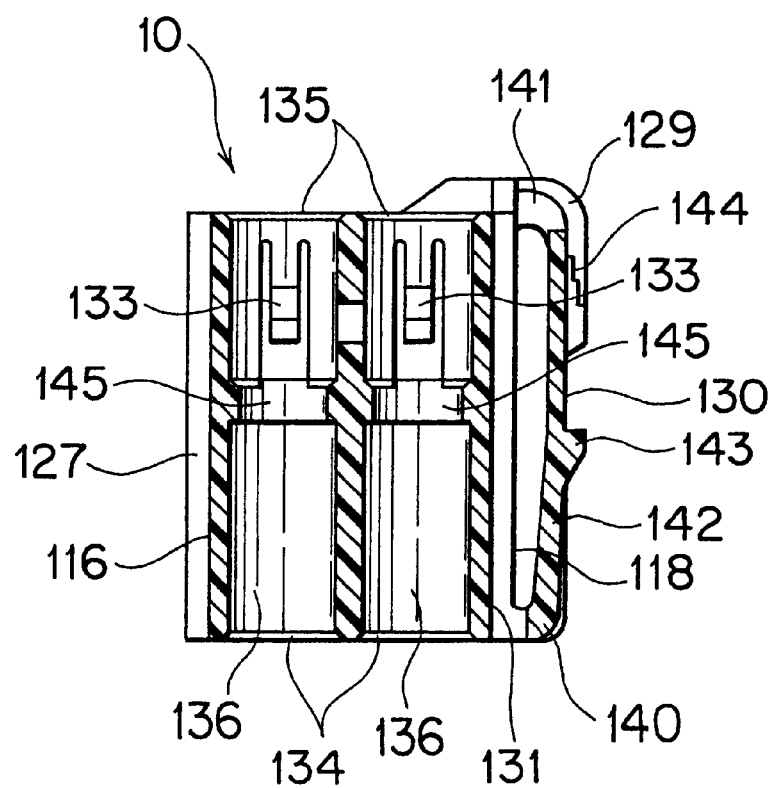
FIG. 47 is a sectional view taken along the line S—S of FIG. 41.
Figure 48:
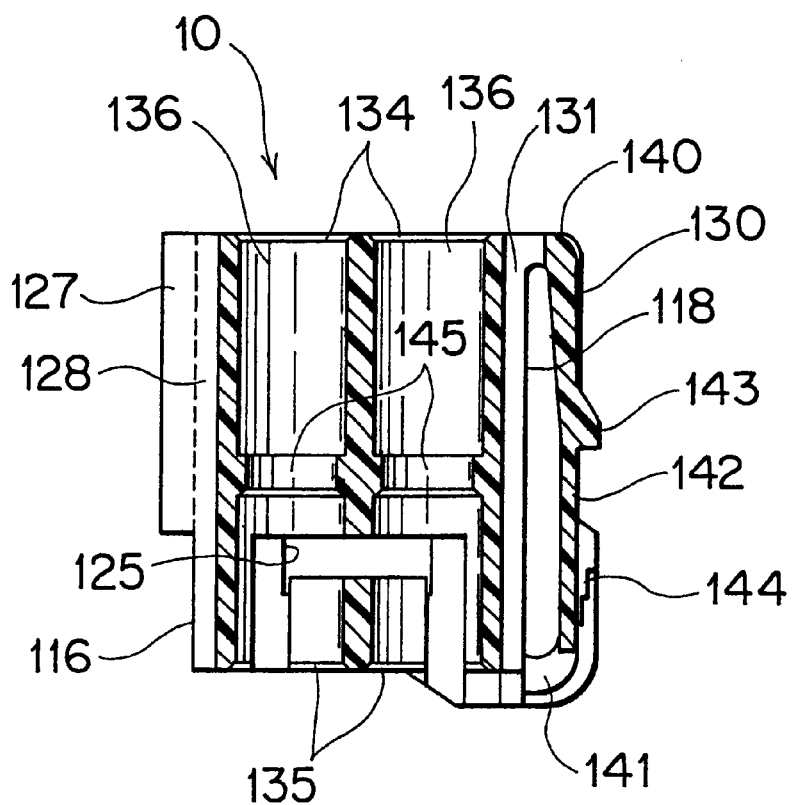
FIG. 48 is a sectional view taken along the line T—T of FIG. 41.
Figure 49:
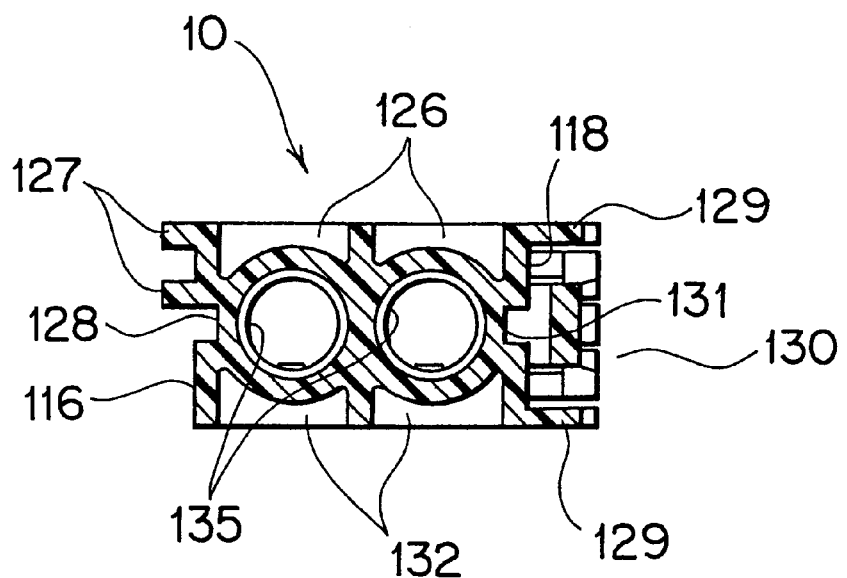
FIG. 49 is a sectional view taken along the line U—U of FIG. 42.

The receiving cavities 136, 136 has a length larger than the longitudinal length of the ferrules 4, 4 so that the distal ends of the small diameter portions 25 of the inserted ferrules 4, 4 do not protrude outside the connection openings 134, 134. (The tip ends of the ferrules 4, 4 are in this way prevented from damage. The end surfaces of the exposed POFs 21 are also protected.) The receiving cavities 136, 136 have the same diameter as that of the insertion openings 135, 135 and of the connection openings 134, 134 and are internally provided at an intermediate length thereof with ring-shaped circumferential stoppers 145, 145 (FIG. 46).

The flanges 27, 27 of the ferrules 4, 4 abut against the stoppers 145, 145 each of which has a circumferential taper at the side toward the flange 27.

With the construction as mentioned above, the optical connector 3 is assembled as follows.

Figure 50:
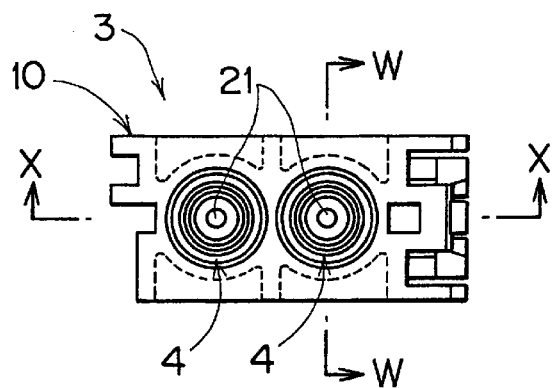
FIG. 50 is a front view of the optical connector of FIG. 40.
Figure 51:
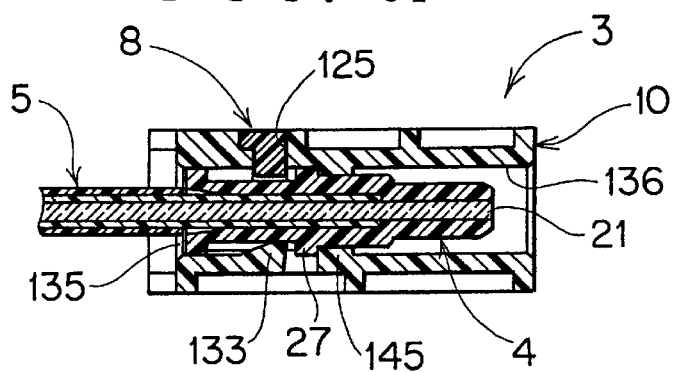
FIG. 51 is a sectional view taken along the line W—W of FIG. 50.
Figure 52:
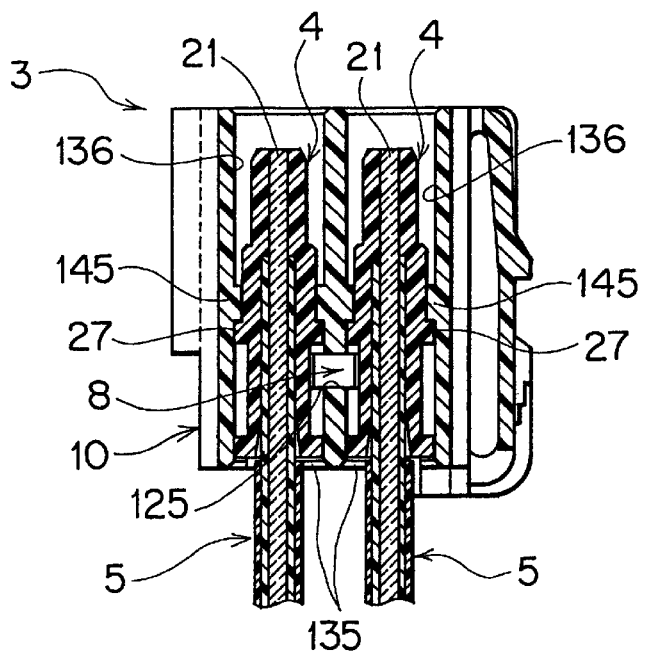
FIG. 52 is a sectional view taken along the line X—X of FIG. 50.

First, as shown in FIGS. 50 to 52, the optical fiber cables 5, 5 attached at the end with the ferrule 4 are inserted and mounted in the optical housing 10 to assemble the optical connector 3.

In other words, the optical fiber cables 5, 5 are pushed through the insertion openings 135, 135 into the receiving cavities 136, 136 until the flanges 27, 27 of the ferrules 4, 4 come into contact with the stoppers 145, 145.

The locking portions 133, 133 (FIGS. 43, 51), if the optical fiber cables 5, 5 fully advance into the receiving cavities 136, 136, come from their outwardly deflected position back to their original position to engage with the flanges 27, 27 of the ferrules 4, 4 and restrict the movement of the optical fiber cables 5, 5 inside the receiving cavities 136, 136.

Thereafter, the holder 8 is fitted in the engagement hole 125 of the optical housing 10, so that it engages with the flanges 27, 27 of the ferrules 4, 4 to double lock the optical fiber cables 5, 5 in position in the receiving cavities 136, 136. The optical connector 3 is thus assembled.

The description made hereinabove concerns the hybrid connector according to this invention which takes the form of a female connector. Description will now be made of a mating male connector which connector-connects to the hybrid connector in the present embodiment.

Figure 53:
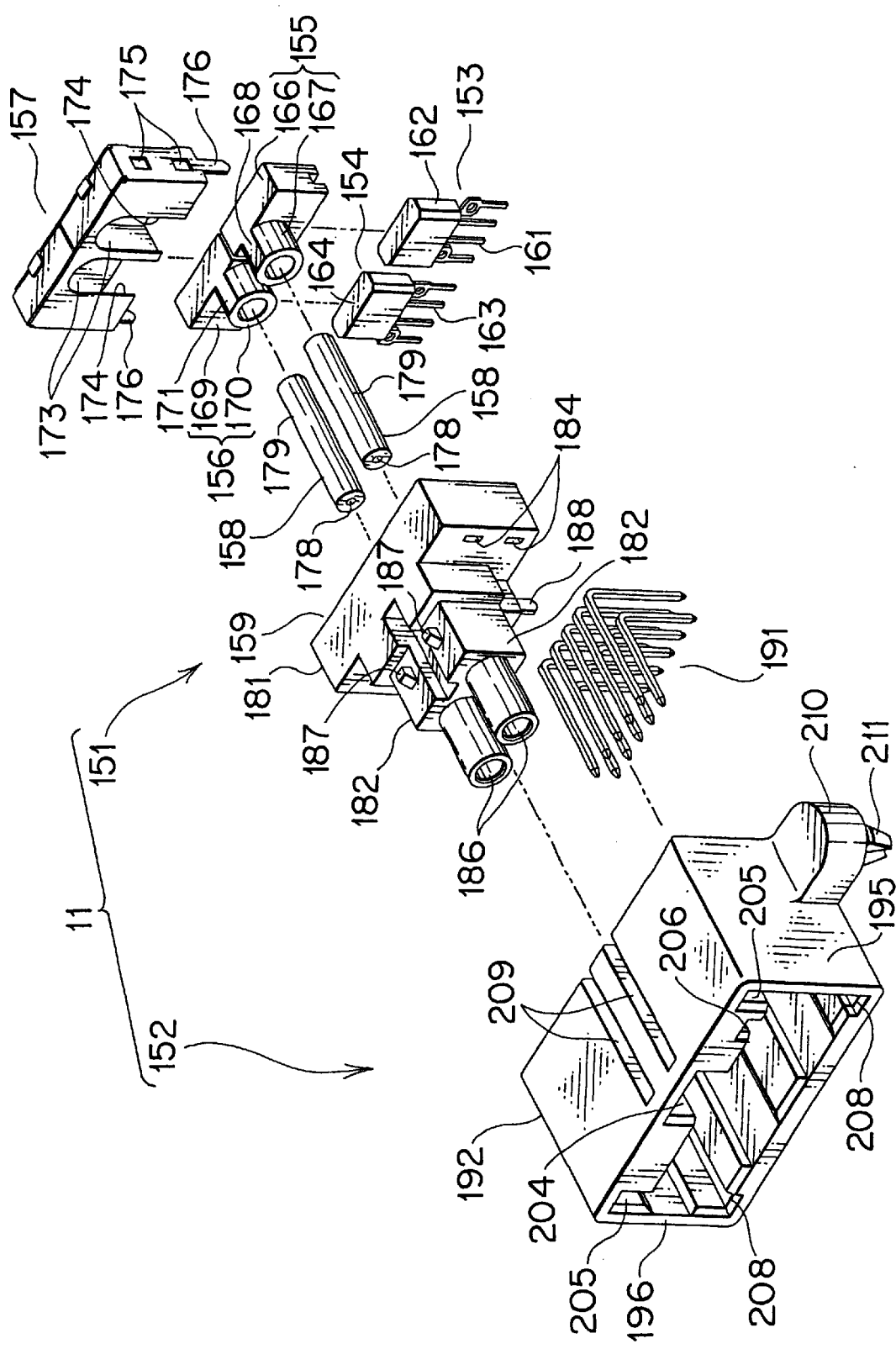
FIG. 53 is an exploded perspective view of a male optical/electrical connector as in FIG. 2.

In FIG. 53, the optical/electrical connector 11 includes a male optical connector 151 and a male electrical connector 152.

Figure 54:
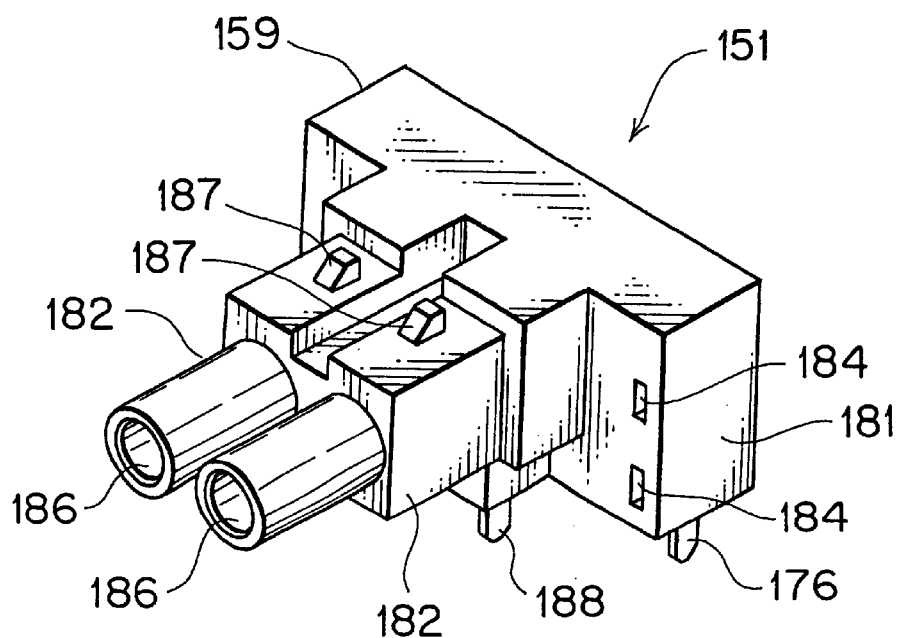
FIG. 54 is a perspective view of a male optical connector as in FIG. 53.

The optical connector 151, as shown in FIGS. 53 and 54, includes FOTs 153, 154 (FOT: fiber optical transceiver, also often referred to as light transmit or receive chip or the like), FOT casings 155, 156, a shield casing 157, sleeves 158, 158, and an optical housing 159.

The FOT 153 includes a molded portion 162 and a plurality of leads 161 extending from the molded portion. One of the leads 161 is mounted with a light emitting element. Wire bonding is also effected. The leads 161 are fixed at the lower end to a not-shown printed circuit board. A light emitting diode (LED), for example, can be mentioned as the light emitting element.

The molded portion 162 is molded from transparent resin material capable of transmitting light (for example, epoxy resin preferably having the same refractive index as that of the POF 21 of the optical fiber cable 5). The leads 161 are embedded at the upper end in the molded portion 162.

The FOT 154 includes a molded portion 164 and a plurality of leads 163 extending from the molded portion. One of the leads 163 is mounted with a light receiving element. Wire bonding is also effected. The leads 163 are fixed at the lower end to the not-shown printed circuit board. A photodiode (PD), for example, can be mentioned as the light receiving element.

The molded portion 164, like the molded portion 162, is molded from transparent resin material capable of transmitting light (for example, epoxy resin preferably having the same refractive index as that of the POF 21). The leads 163 are embedded at the upper end in the molded portion 164.

The FOT casing 155 is made of conductive synthetic resin material and includes a case body 166 covering the molded portion 162 of the FOT 153 and a cylindrical portion 167 projecting from the case body 166. The case body 166 has a bottomed box-like shape. The cylindrical portion 167 is located on a front side of the light emitting element of the FOT 153, receives the related sleeve 158, and is formed with a flat surface 168 cut thereon.

The FOT casing 156, like the FOT casing 155, is made of conductive synthetic resin material and includes a case body 169 covering the molded portion 164 of the FOT 154 and a cylindrical portion 170 projecting from the case body 169. The case body 169 has a bottomed box-like shape. The cylindrical portion 170 is located on a front side of the light receiving element of the FOT 154, receives the related sleeve 158, and is formed with a flat surface 171 cut thereon.

The shield casing 157 is made of a stamped conductive thin metal plate and has two receiving sections 173, 173, each having a U-shaped cutout 174, rectangular through holes 175, 175 and a fixing portion 176 with which to fix to the not-shown printed circuit board.

The receiving sections 173, 173 receive the respective FOT casings 155 and 156. Behind the wall having the cutout 174 is provided a not-shown convex portion for holding the FOT casing 155, 156 in pressed-in position in the receiving section 173.

The cylindrical portions 167 and 170 are received in the cutouts 174, 174. If the cylindrical portions 167, 170 are received, the FOT casings 155 and 156 and thus the FOTs 153, 154 inside the respective FOT casings 155 and 156 are placed in position.

In the through holes 175, 175 are engaged corresponding locking projections 183 (FIG. 56) provided on the optical housing 159.

The fixing portions 176, 176, like the leads 161 and 163, are fixed to the not-shown printed circuit board and also serve as a ground terminal.

Each sleeve. 158 is constituted by an optical fiber 178 made up of a core and a cladding, and a cylindrical holder 179. Incidentally, the sleeves 158, 158 may be provided, in one method, by cutting the optical fiber cables 5, 5 (FIG. 3) in predetermined lengths and grinding them at their both ends.

The optical housing 159 is made of conductive synthetic resin material and includes a box-like FOT receiving section 181 and sleeve receiving sections 182, 182 projecting from the FOT receiving section 181.

The FOT receiving section 181 fixes therein the shield casing 157 and is internally provided with the locking projections 183 (FIG. 56) engageable in the through holes 175 of the shield casing. Denoted 184 are mold-removing holes for forming the locking projections 183.

Inside each sleeve receiving section 182 are formed a large and small diameter bores 185 and 186 (FIGS. 56, 57), the large diameter bore 185 communicating to the FOT receiving section 181 and receiving the cylindrical portion 167, 170, the small diameter bore 186 contiguous to the large diameter bore 185 and receiving the sleeve 158, 158.

The sleeve receiving sections 182, 182 are provided at the outside with four locking projections 187 for the electrical connector 152 and also with ground terminals 188, 188 which are fixed to the not-shown printed circuit board. The outer diameter of the sleeve receiving sections 182, 182 is slightly smaller than that of the above-mentioned connection openings 76, 76 (FIG. 12).

The electrical connector 152, as shown in FIGS. 53 and 55 to 57, includes a plurality of PCB terminals 191 and an electrical housing 192 of synthetic resin.

The PCB terminals 191 are of a male type and bent in L-like form to be mounted at one end in the electrical housing 192 and fixed at the other end to the not-shown printed circuit board. (The PCB terminals 191, in the present embodiment, are mounted in two, upper and lower tiers in the electrical housing 192 and thus provided in two types having different lengths.)

The electrical housing 192 has a box-like shape of substantially rectangular cross section opening at the front and includes a PCB terminal mount section 193 and an optical connector mount section 194.

The PCB terminal mount section 193 is located toward a right side wall 195 of the electrical housing 192 and receives the PCB terminals 191 at the one end in a row arrangement in two tiers.

The optical connector mount section 194 is located toward a left side wall 196 of the electrical housing 192 and includes a holder portion 198 projecting from a rear wall 197 of the electrical housing 192 and an insertion opening 199 formed in the holder portion 198 for insertion therein of the sleeve receiving sections 182, 182 of the optical connector 151.

The holder portion 198 internally has four engagement holes 200 corresponding to the four locking projections 187 of the sleeve receiving sections 182, 182. The insertion hole 199 conforms in shape to the outside shape of the sleeve receiving sections 182, 182. The taper surface 202 (FIG. 55) facing the insertion hole 199 cooperates with a taper surface 201 on the part of the sleeve receiving sections 182, 182 to prevent an erroneous mounting of the sleeve receiving sections 182, 182 in the insertion hole 199.

Inside the electrical housing 192, at the upper wall 203 side, there are provided an engagement groove 204 for the locking arm 57 (FIG. 12) of the electrical housing 42 and guide grooves 205, 205, 206 for the respective guide ribs 58, 58, 59 (FIG. 12). At the lower wall 207 side, there are provided guide grooves 208, 208 for the guide ribs 62, 62 (FIG. 12) of the electrical housing 42.

On its upper wall, the electrical housing 192 has engagement slits 209, 209 (FIGS. 53, 56) in communication to the engagement groove 204, for engagement therein of the locking projections 78, 78 (FIG. 12) of the locking arm 57 of the electrical housing 42.

The right and left side walls 195 and 196 of the electrical housing 192 are provided with a mounting portion 210 (FIG. 55) with which to mount on the not-shown printed circuit board. The mounting portion 210 has a clip 211 for insertion through elastic deformation through and engagement with a corresponding hole formed in the not-shown printed circuit board.

With the construction as described above, the optical/electrical connector 11 is assembled as follows.

Figure 55:
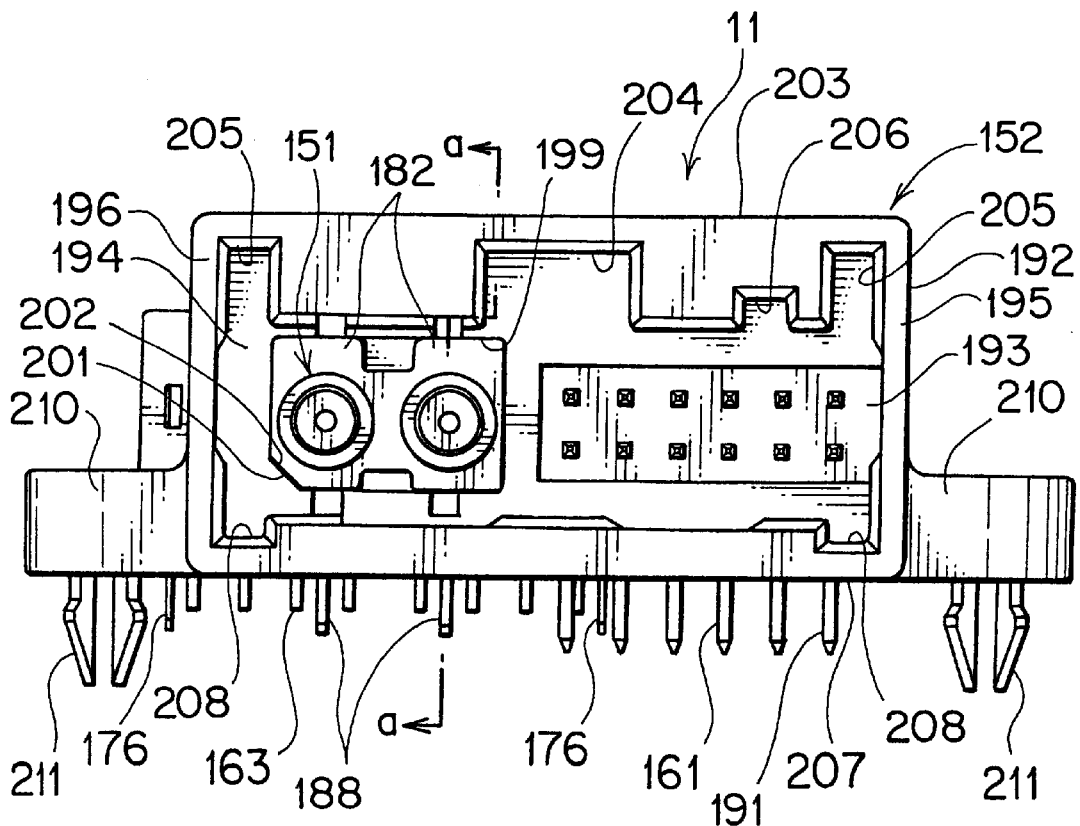
FIG. 55 is a front view of the optical/electrical connector of FIG. 53.
Figure 56:
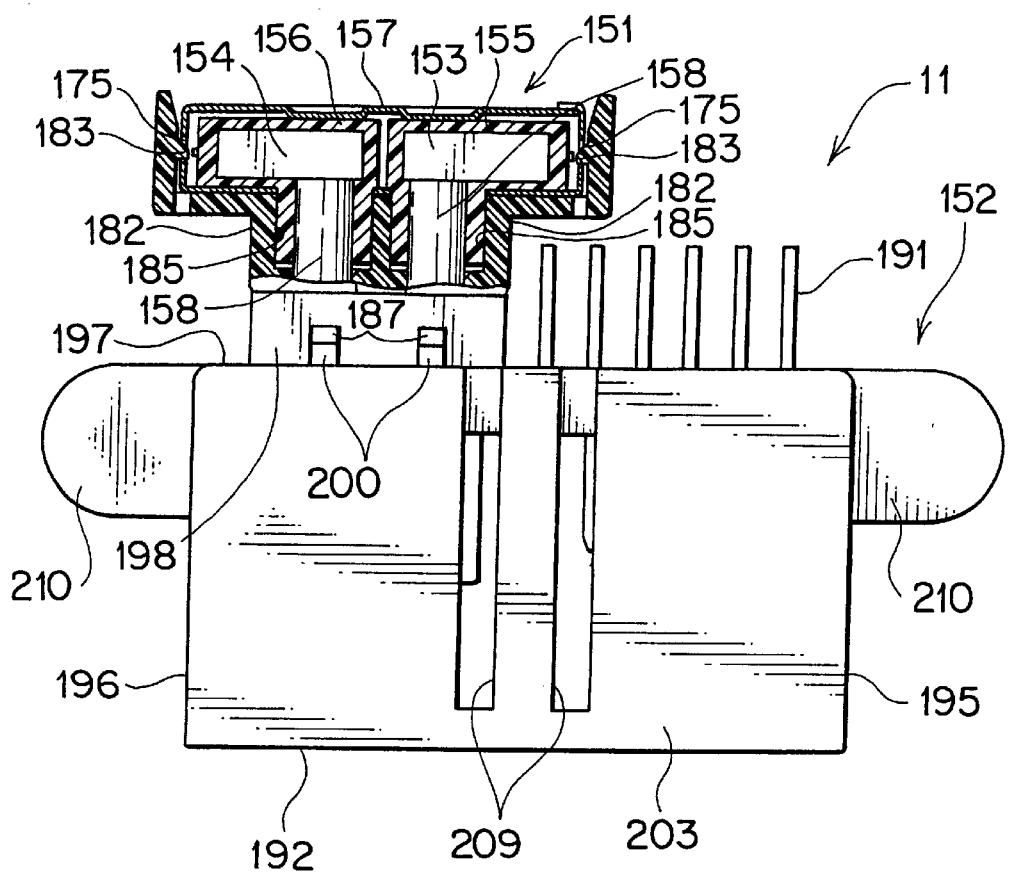
FIG. 56 is a partially sectional plan view of the optical/electrical connector of FIG. 55.
Figure 57:
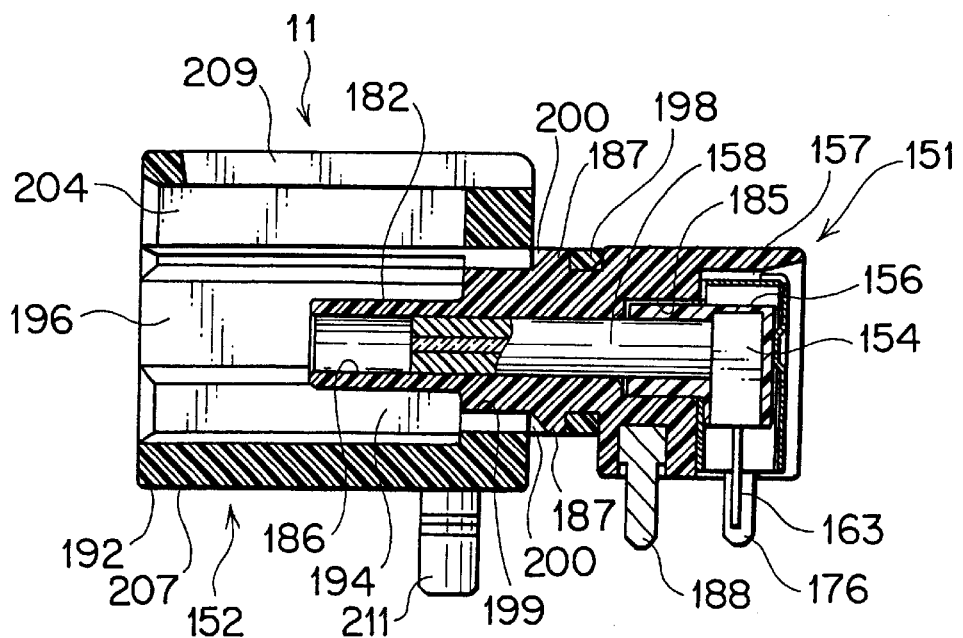
FIG. 57 is a sectional view taken along the line a—a of FIG. 55.

As shown in FIGS. 55 to 57, after the plurality of PCB terminals 191 are mounted in the electrical connector 152 by one-piece molding or press fitting, the optical connector 151 is fitted in the optical connector mount section 194 to assemble the optical/electrical connector 11.

Description will now be made of the optical connector 12.

Figure 58:
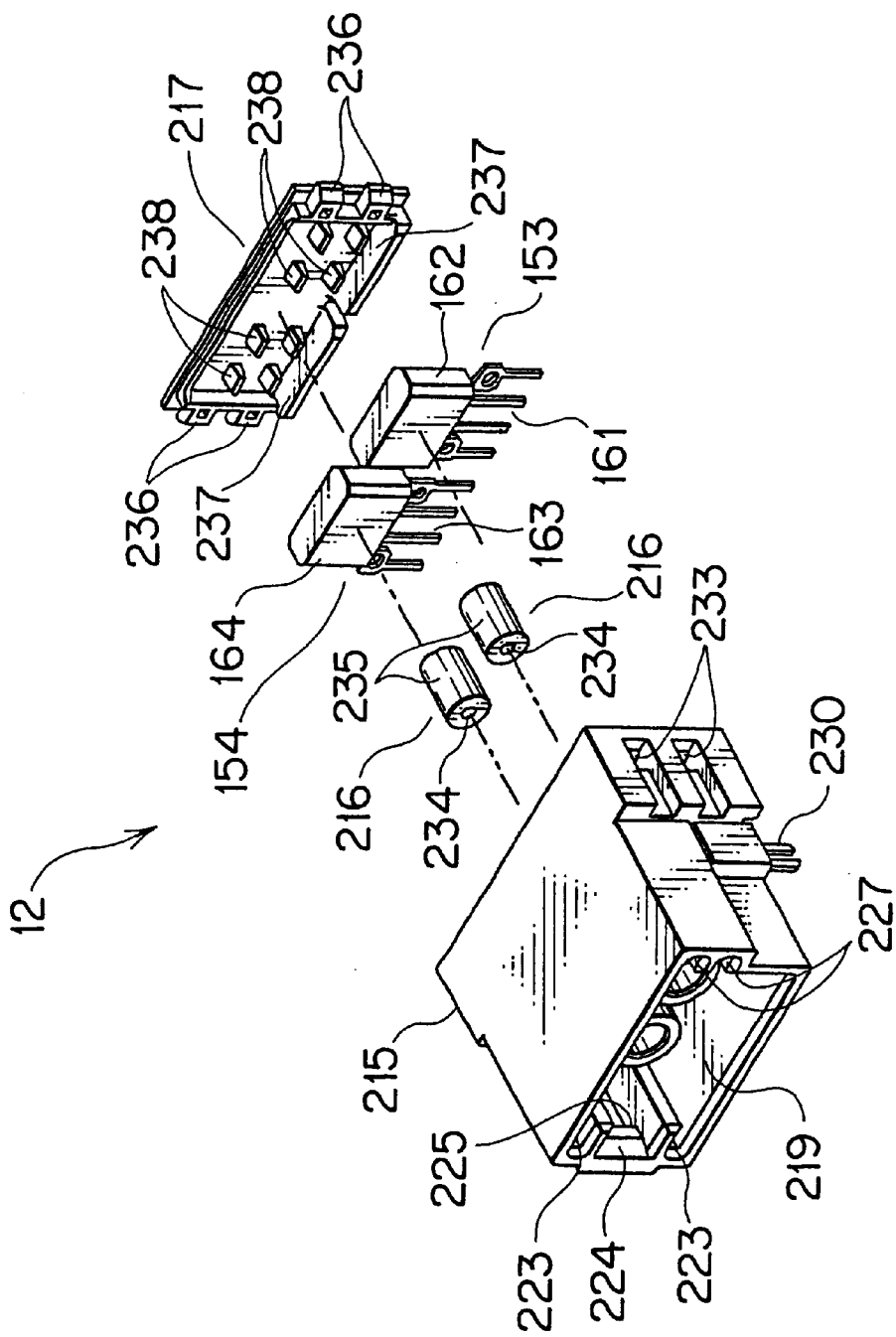
FIG. 58 is an exploded perspective view of a male optical connector as in FIG. 2.
Figure 59:
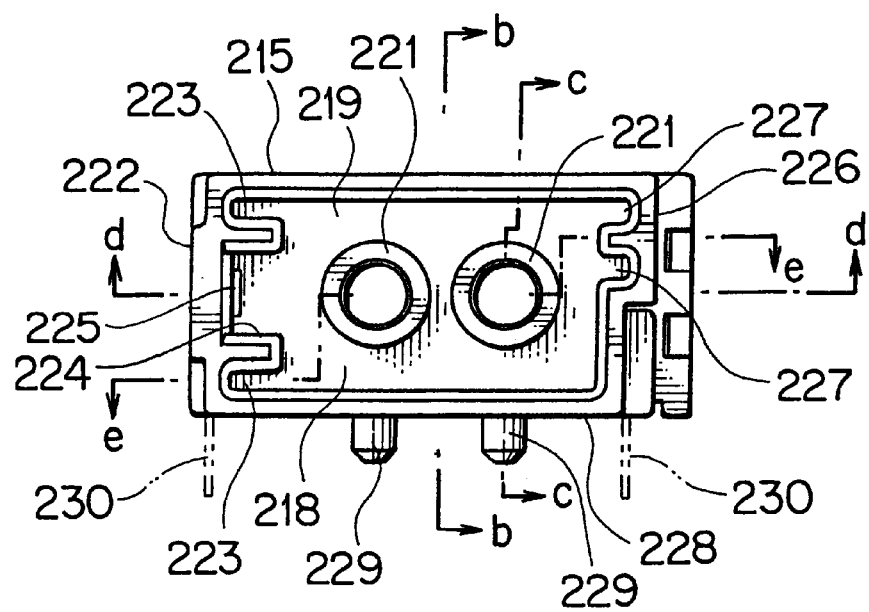
FIG. 59 is a front view of an optical housing as in FIG. 58.
Figure 60:
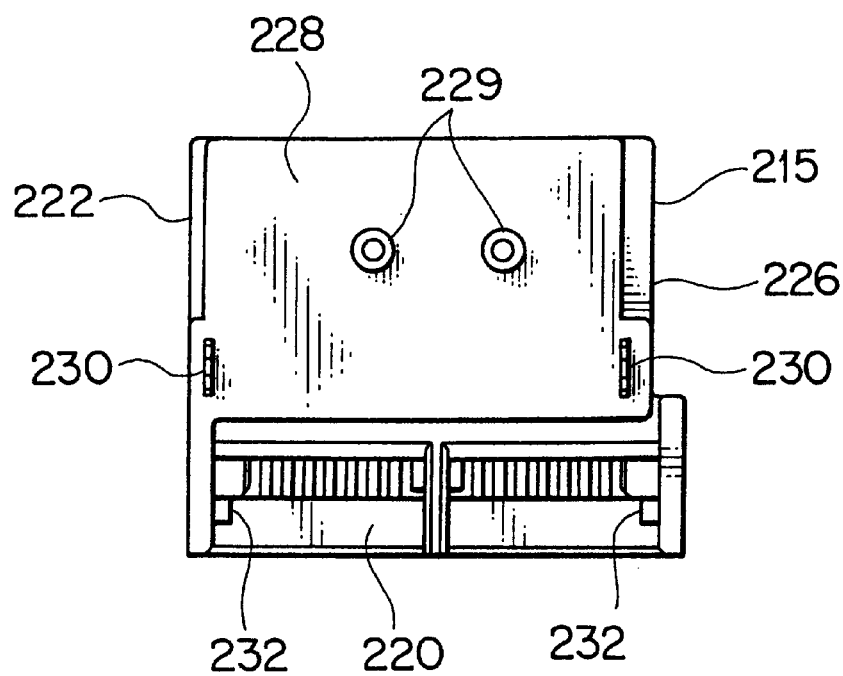
FIG. 60 is a bottom view of the optical housing.
Figure 61:
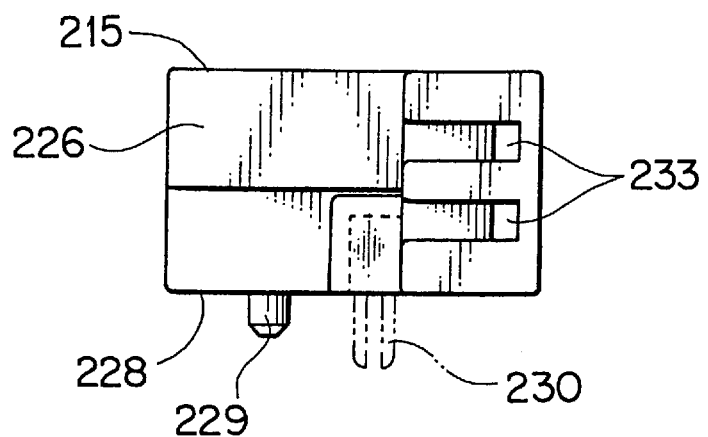
FIG. 61 is a right side view of the optical housing.
Figure 62:
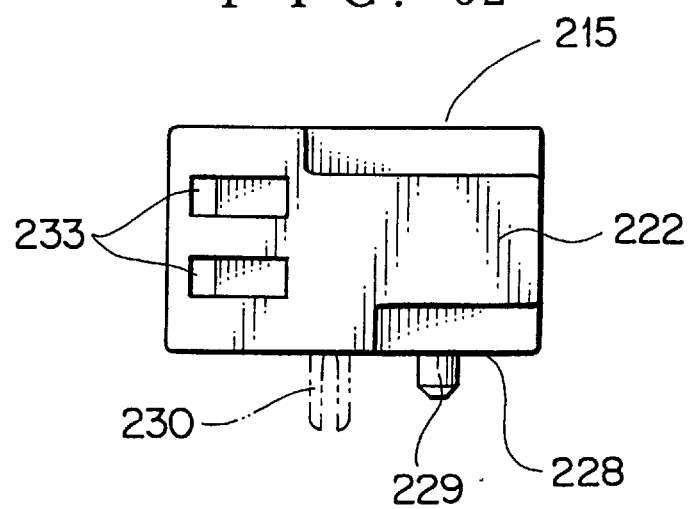
FIG. 62 is a left side view of the optical housing.
Figure 63:
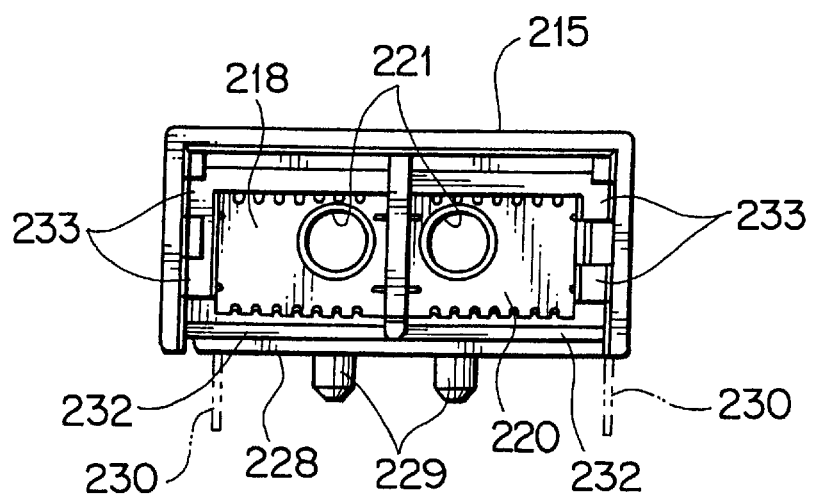
FIG. 63 is a rear view of the optical housing.
Figure 64:
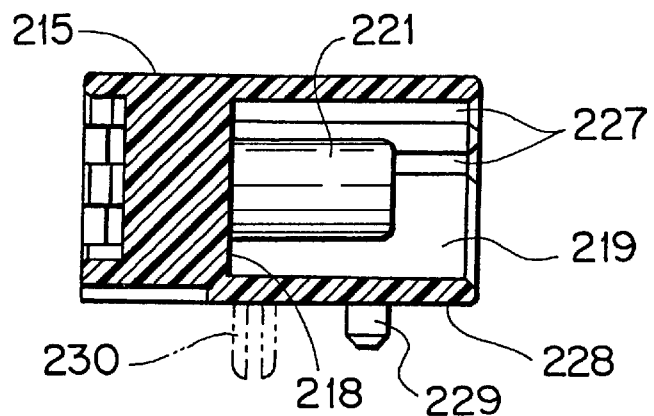
FIG. 64 is a sectional view taken along the line b—b of FIG. 59.
Figure 65:
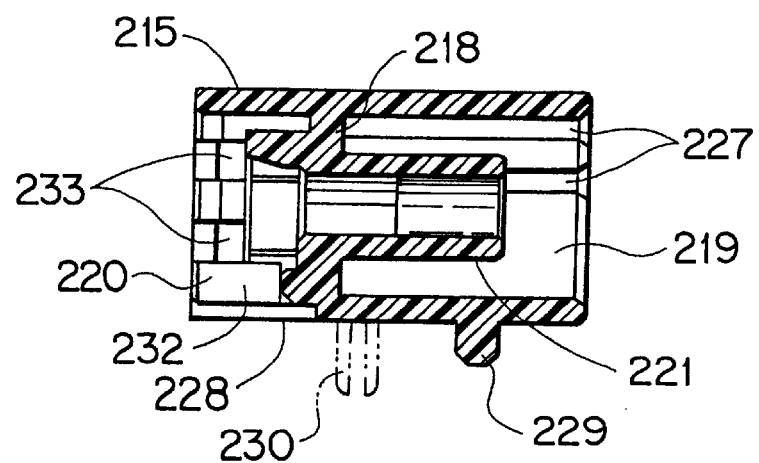
FIG. 65 is a sectional view taken along the line c—c of FIG. 59.
Figure 66:
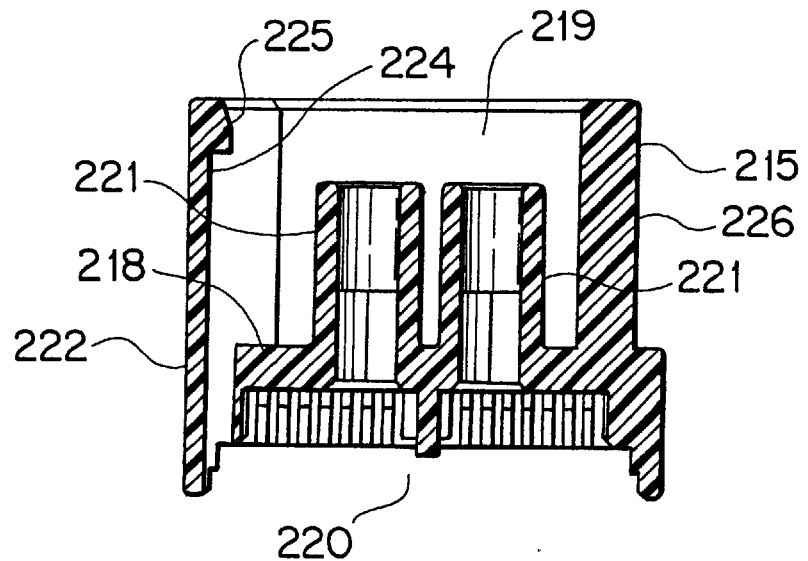
FIG. 66 is a sectional view taken along the line d—d of FIG. 59.
Figure 67:
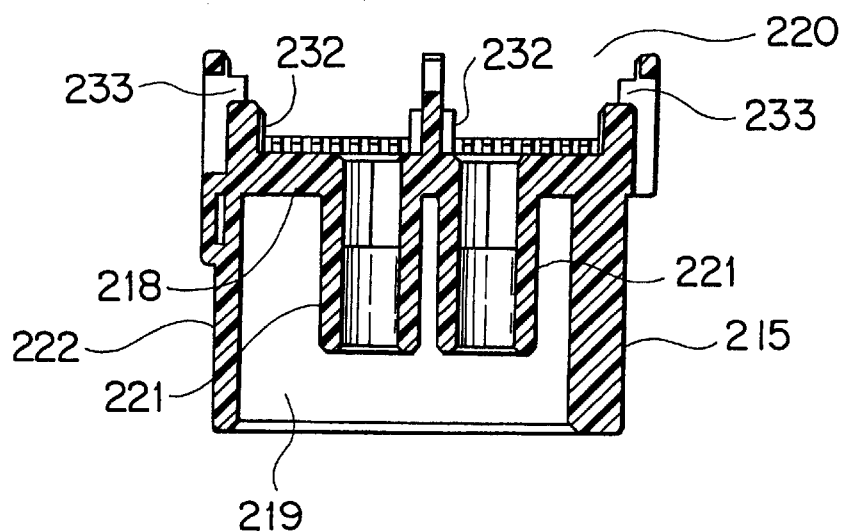
FIG. 67 is a sectional view taken along the line e—e of FIG. 59.

In FIG. 58, the male optical connector 12 includes an optical housing 215 of conductive synthetic resin material, sleeves 216, 216, FOTs 153, 154 (the same ones as mentioned above), and a cap 217 of conductive synthetic resin material.

The optical housing 215, as shown in FIGS. 58 to 67, has a box-like shape of substantially rectangular cross section opening at the front and the rear and an internal partition wall 218 to provide open spaces forwardly and rearwardly of the partition wall 218. The forward open space forms a fitting section 219 for the female connector 2, 3 and the rearward open space forms a receiving section 220 for FOTs 153, 154.

The partition wall 218 is provided with receiving cylinders 221, 221 projecting into the fitting section 219 and intercommunicating the fitting section 219 and the receiving section 220. Into the receiving cylinders 221, 221 are placed the sleeves 216, 216. The outer diameter of the receiving cylinders 221, 221 is slightly smaller than that of the connection openings 134, 134 (FIG. 41) of the optical housing 10.

Figure 41:
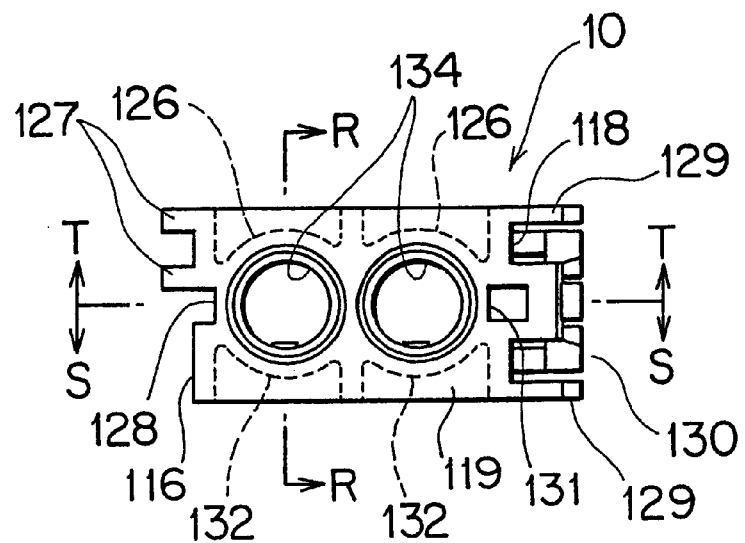
FIG. 41 is a front view of an optical housing as in FIG. 39.
Figure 42:
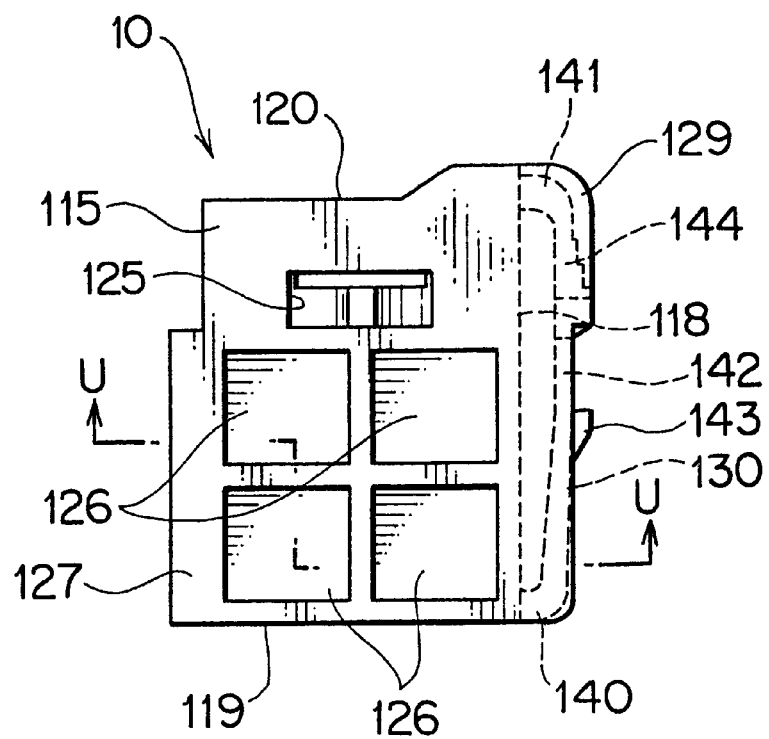
FIG. 42 is a plan view of the optical housing.
Figure 43:
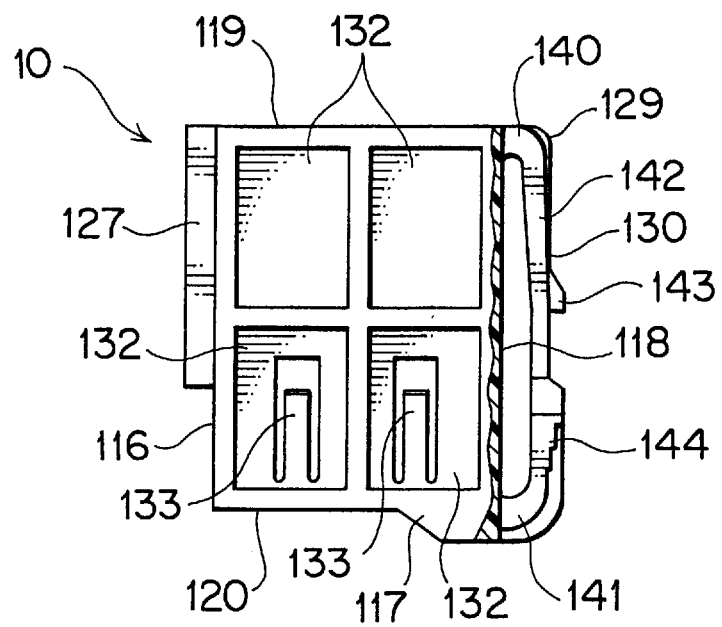
FIG. 43 is a bottom view of the optical housing.
Figure 44:
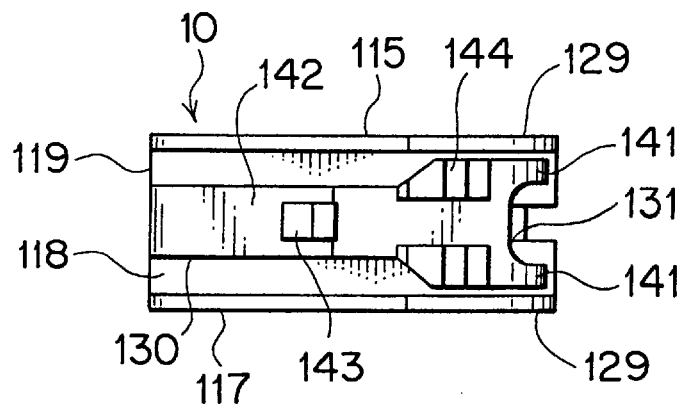
FIG. 44 is a right side view of the optical housing.
Figure 45:
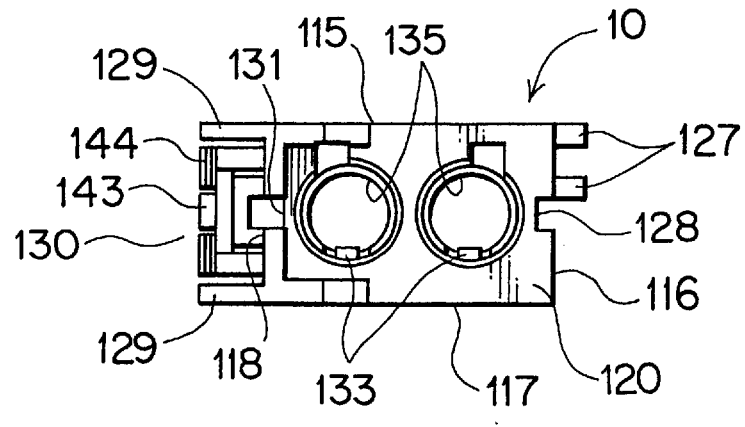
FIG. 45 is a rear view of the optical housing.

The left side wall 222 of the optical housing 215 is provided at the fitting section 219 with guide grooves 223, 223 for the guide ribs 129, 129 (FIG. 41) of the optical housing 10 and an engagement groove 224 for the locking portion 130 (FIG. 41). Inside the engagement groove 224 is formed a claw-like engagement portion 225 for engagement with the locking projection 143 (FIG. 44) of the locking portion 130 (FIG. 41).

The right side wall 226 of the optical housing 215 is provided at the fitting section 219 with guide grooves 227, 227 for the guide ribs 127, 127 (FIG. 41) of the optical housing 10.

The lower wall 228 of the optical housing 215 is provided with pins 229, 229 with which the optical housing 215 is mounted on the not-shown printed circuit board. Denoted 230, 230 are ground terminals extending from the lower wall 228 of the optical housing 215.

The receiving section 220 has a partition wall 231 which divides the FOTs 153 and 154 accommodated therein. Openings 232, 232 through which the leads 161, 163 of the FOTs 153, 154 are let out, are formed in the lower wall 228 at the receiving section 220. The left and right side walls 222 and 226 at the receiving section 220 are formed with engagement portions 233 with which the cap 217 engages to be locked.

Each sleeve 216, as shown in FIG. 58, is constituted by an optical fiber 234 made up of a core and a cladding, and a cylindrical holder 235. Incidentally, the sleeves 216, 216 may be provided, in one method, by cutting the optical fiber cables 5, 5 (FIG. 3) inpredetermined lengths and grinding them at their both ends.

The cap 217, as shown in FIG. 58, has a rectangular plate-like shape and is provided at opposite left and right sides with two locking projections 236 engageable with the corresponding engagement portions 233 of the optical housing 215. Plates 237, 237 are provided at the lower end of the cap 217 to project toward the leads 161, 163 of the FOTs 153, 154. On its wall toward the receiving section 220 of the optical housing 215, the cap 217 further has a plurality of pressing pieces 238 which press on the FOTs 153, 154.

With the construction as mentioned above, the optical connector 12 is assembled as follows.

Figure 68:
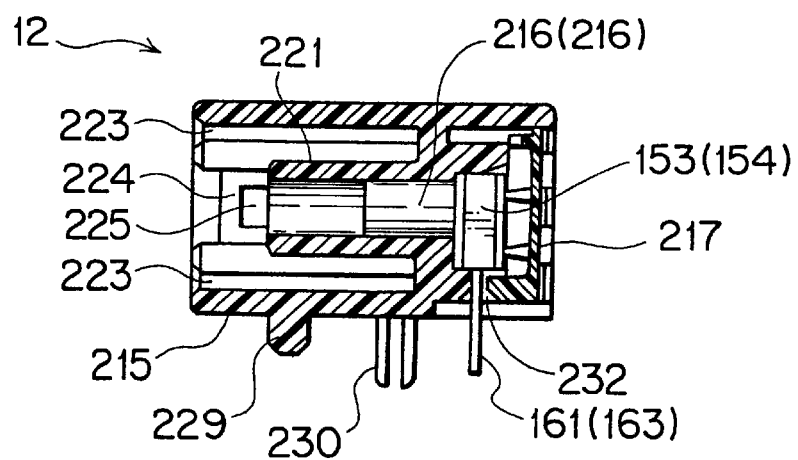
FIG. 68 is a longitudinal sectional view of the optical connector of FIG. 58.
Figure 69:
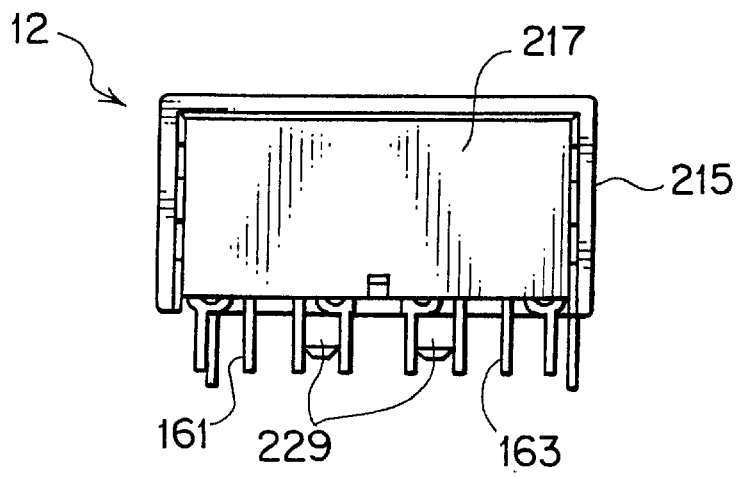
FIG. 69 is a rear view of the optical connector of FIG. 58.

As shown in FIGS. 68 and 69, the sleeves 216, 216, the FOTs 153, 154 and the cap 217 are mounted in position in this order in the receiving section 220 (FIG. 63) to assemble the optical connector 12.

As described hereinbefore with reference to FIGS. 1 to 69, the optical/electrical connector 1 or the optical connector 2, 3 can be assembled from constituent elements selected in accordance with the mating connector. In other words, with the optical connector 87 selected as a reference connector, the electrical connector 7, the optical adapter cover 9 or the optical housing 10 may be selected to be combined with the optical connector 87 depending on the mating connector. The hybrid connector according to this invention, in connecting to an electronic component or the like, may selectively take one of the three forms of the optical/electrical connector or the optical connector 2, 3. The commonly usable holder 8 is advantageously usable in such hybrid connector.

It is to be noted that this invention is also applicable to a connector for use with a one core type optical fiber bidirectional communication system.

Having now fully described the invention, it will be apparent to one of ordinary skill in the art that many changes and modifications can be made thereto without departing from the spirit and scope of the invention as set forth herein.

What is claimed is:

1. A hybrid connector comprising:

an optical fiber cable having a ferrule attached at one end thereof;

an optical adapter having an insertion opening and a receiving cavity for said one end of said optical fiber cable and a connection opening located at a side opposite said insertion opening for connection therethrough of said one end of said optical fiber cable, arranged contiguously along an insertion direction of said one end of said optical fiber cable;

an electrical connector having terminal receiving cavities formed therein for receiving electrical terminals and an optical adapter mount section for receiving said optical adapter;

an optical adapter cover for receiving said optical adapter, having walls arranged circumferentially relative to said insertion direction of said one end of said optical fiber cable; and an optical housing having a housing side insertion opening and a housing side receiving cavity for said one end of said optical fiber cable and a housing side connection opening located at a side opposite said housing side insertion opening for connection therethrough of said one end of said optical fiber cable, arranged contiguously along said insertion direction of said one end of said optical fiber cable;

wherein said hybrid connector is selectively assembled as an optical/electrical connector including said optical fiber cable, said optical adapter and said electrical connector, as a first optical connector including said optical fiber cable, said optical adapter and said optical adapter cover, or as a second optical connector including said optical fiber cable and said optical housing.

2. The hybrid connector according to claim 1, further comprising a holder and wherein said optical adapter, said electrical connector, said optical adapter cover and said optical housing have an engagement hole substantially of the same size for said holder, wherein when said hybrid connector is assembled as said optical/electrical connector, said holder is fitted and inserted, in a direction perpendicular to said insertion direction of said one end of said optical fiber cable, through said engagement holes of said electrical connector and said optical adapter to come into locking engagement with said optical adapter and said ferrule, wherein when said hybrid connector is assembled as said first optical connector, said holder is fitted and inserted through said engagement holes of said optical adapter cover and said optical adapter to come into locking engagement with said optical adapter and said ferrule, and wherein when said hybrid connector is assembled as said second optical connector, said holder is fitted and inserted through said engagement hole of said optical housing to come into locking engagement with said ferrule.

3. The hybrid connector according to claim 2, wherein said ferrule has a circumferential flange at an intermediate length thereof, and said holder comes into locking engagement with said circumferential flange.

4. The hybrid connector according to claim 3, wherein said optical adapter has a locking projection projecting in a cantilever manner into said receiving cavity to engage with said circumferential flange of said ferrule to double lock said one end of said optical fiber cable in said receiving cavity.

5. The hybrid connector according to claim 1, wherein said optical adapter cover and said optical housing have substantially the same outside configuration to be selectively mountable in the same mating optical connector.

6. The hybrid connector according to claim 1, wherein said receiving cavity of said optical adapter and said housing side receiving cavity of said optical housing have substantially the same size to receive said one end of said optical fiber cable.

7. The hybrid connector according to claim 1, wherein said hybrid connector is of a female type.

8. The hybrid connector according to claim 1, wherein said receiving cavity of said optical adapter and said housing side receiving cavity of said optical housing have a longitudinal length larger than that of said ferrule, so that a tip end of said ferrule received in either one of said receiving cavities is not exposed from said respective connection opening.

9. A hybrid connector comprising:
an optical fiber cable having a ferrule attached at one end thereof;
an optical adapter having an insertion opening and a receiving cavity for said one end of said optical fiber cable and a connection opening located at a side opposite said insertion opening for connection therethrough of said one end of said optical fiber cable, arranged contiguously along an insertion direction of said one end of said optical fiber cable;
an electrical connector having terminal receiving cavities formed therein for receiving electrical terminals and an optical adapter mount section for receiving said optical adapter; and
an optical adapter cover for receiving said optical adapter, having walls arranged circumferentially relative to said insertion direction of said one end of said optical fiber cable;
wherein said hybrid connector is selectively assembled as an optical/electrical connector including said optical fiber cable, said optical adapter and said electrical connector, or as an optical connector including said optical fiber cable, said optical adapter and said optical adapter cover.

10. The hybrid connector according to claim 9, further comprising a holder and wherein said optical adapter, said electrical connector and said optical adapter cover have an engagement hole substantially of the same size for said holder, wherein when said hybrid connector is assembled as said optical/electrical connector, said holder is fitted and inserted, in a direction perpendicular to said insertion direction of said one end of said optical fiber cable, through said engagement holes of said electrical connector and said optical adapter to come into locking engagement with said optical adapter and said ferrule, and wherein when said hybrid connector is assembled as said optical connector, said holder is fitted and inserted through said engagement holes of said optical adapter cover and said optical adapter to come into locking engagement with said optical adapter and said ferrule.

11. The hybrid connector according to claim 10, wherein said ferrule has a circumferential flange at an intermediate length thereof, and said holder comes into locking engagement with said circumferential flange.

12. The hybrid connector according to claim 11, wherein said optical adapter has a locking projection projecting in a cantilever manner into said receiving cavity to engage with said circumferential flange of said ferrule to double lock said one end of said optical fiber cable in said receiving cavity.

13. The hybrid connector according to claim 9, wherein said hybrid connector is of a female type.

14. The hybrid connector according to claim 9, wherein said receiving cavity of said optical adapter has a longitudinal length larger than that of said ferrule, so that a tip end of said ferrule received in said receiving cavity is not exposed from said connection opening.

15. The hybrid connector according to claim 1 or 9, wherein two of said optical fiber cables are provided, one for sending and the other for receiving optical signals.

* * * * *